(12) United States Patent
Cheng et al.

(10) Patent No.: US 12,148,237 B2
(45) Date of Patent: *Nov. 19, 2024

(54) IMAGING CONTROL CIRCUIT FOR COLLECTING OBJECT IMAGE DATA FOR AN OBJECT

(71) Applicant: Novatek Microelectronics Corp., Hsinchu (TW)

(72) Inventors: Huan-Teng Cheng, Hsinchu (TW); Ting-Hsuan Hung, Hsinchu (TW); Wei-Lun Shih, Hsinchu (TW); Huang-Chin Tang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,730

(22) Filed: May 22, 2023

(65) Prior Publication Data

US 2023/0316800 A1  Oct. 5, 2023

Related U.S. Application Data

(63) Continuation-in-part of application No. 17/553,730, filed on Dec. 16, 2021, now Pat. No. 11,854,451.

(Continued)

(51) Int. Cl.
  *G06V 40/13*  (2022.01)
  *G06F 3/041*  (2006.01)
  *G09G 3/20*   (2006.01)

(52) U.S. Cl.
  CPC ............ *G06V 40/13* (2022.01); *G06F 3/0412* (2013.01); *G06V 40/1318* (2022.01); *G09G 3/20* (2013.01); *G09G 2310/0272* (2013.01)

(58) Field of Classification Search
None
See application file for complete search history.

(56) References Cited

U.S. PATENT DOCUMENTS

| 8,942,937 B2 | 1/2015 | Miyamoto et al. |
| 9,256,806 B2 | 2/2016 | Aller et al. |

(Continued)

FOREIGN PATENT DOCUMENTS

| CN | 1267849 | 8/2006 |
| CN | 103294987 | 9/2013 |

(Continued)

OTHER PUBLICATIONS

"Notice of allowance of Taiwan Related Application, Application No. 111139990", issued on Oct. 13, 2023, p. 1-p. 3.

(Continued)

*Primary Examiner* — Joseph R Haley
(74) *Attorney, Agent, or Firm* — JCIPRNET

(57) ABSTRACT

An imaging control circuit for collecting object image data for an object presented on a portion of a surface of a display panel is provided. The imaging control circuit includes a first circuit, a second circuit and a third circuit. The first circuit is adapted to receive touch sensing signals from a set of touch sensors located in the display panel. The second circuit is adapted to receive object image sensing signals from a set of imaging sensors. The object image sensing signals are associated with the object detected on the surface of the display panel. The third circuit is adapted to determine a location of the object from the touch sensing signals and generate a variable sized object imaging zone based on a location and a size of an object image. The variable sized object imaging zone includes a variable subset of the imaging sensors.

15 Claims, 26 Drawing Sheets

Related U.S. Application Data which is a continuation of application No. 16/907,306, filed on Jun. 21, 2020, now Pat. No. 11,244,135.

(60) Provisional application No. 62/924,671, filed on Oct. 22, 2019, provisional application No. 62/912,660, filed on Oct. 9, 2019, provisional application No. 62/898,551, filed on Sep. 11, 2019, provisional application No. 62/881,912, filed on Aug. 1, 2019.

(56) References Cited

U.S. PATENT DOCUMENTS

| | | | |
|---|---|---|---|
| 9,454,271 | B2 | 9/2016 | Miyamoto et al. |
| 9,773,148 | B2 | 9/2017 | Mo et al. |
| 9,785,823 | B2 | 10/2017 | Mather et al. |
| 9,898,136 | B2 | 2/2018 | Miyamoto et al. |
| 2014/0139483 | A1 | 5/2014 | Miyamoto et al. |
| 2014/0149059 | A1 | 5/2014 | Miyamoto et al. |
| 2015/0254491 | A1 | 9/2015 | Mo et al. |
| 2016/0188062 | A1 | 6/2016 | Jung et al. |
| 2016/0232401 | A1 | 8/2016 | Hoyos et al. |
| 2016/0349923 | A1 | 12/2016 | Miyamoto et al. |
| 2018/0349669 | A1 | 12/2018 | Kim et al. |
| 2020/0210677 | A1* | 7/2020 | Huang ............... G06V 10/147 |

FOREIGN PATENT DOCUMENTS

| | | |
|---|---|---|
| CN | 104898314 | 9/2015 |
| CN | 104978559 | 10/2015 |
| CN | 109635537 | 4/2019 |
| TW | 200841253 | 10/2008 |
| TW | 201305873 | 2/2013 |

OTHER PUBLICATIONS

Longjie Su et al., "Design of Portable Fingerprint Attendance and Information Management System", Computer Measurement & Control, with English abstract, Jun. 25, 2017, pp. 181-184, vol. 25, No. 6.

"Office Action of China Counterpart Application", issued on Apr. 4, 2024, p. 1-p. 8.

* cited by examiner

IMAGING CONTROL CIRCUIT FOR COLLECTING OBJECT IMAGE DATA FOR AN OBJECT

CROSS-REFERENCE TO RELATED APPLICATION

This application is a continuation-in-part application of and claims the priority benefit of U.S. patent application Ser. No. 17/553,730, filed on Dec. 16, 2021, now pending. The prior U.S. patent application Ser. No. 17/553,730 is a continuation application of and claims the priority benefit of U.S. patent application Ser. No. 16/907,306, filed on Jun. 21, 2020, now patented. The prior U.S. patent application Ser. No. 16/907,306 claims the priority benefits of U.S. Provisional application Ser. No. 62/881,912, filed on Aug. 1, 2019, U.S. Provisional application Ser. No. 62/898,551, filed on Sep. 11, 2019, U.S. Provisional application Ser. No. 62/912,660, filed on Oct. 9, 2019, and U.S. Provisional application Ser. No. 62/924,671, filed on Oct. 22, 2019. The entirety of each of the above-mentioned patent applications is hereby incorporated by reference herein and made a part of this specification.

FIELD OF THE INVENTION

The invention relates to sensing of images for identification purposes on electronic devices, and particularly to an imaging control circuit for collecting object image data for an object presented on a portion of a surface of a display panel.

BACKGROUND

In recent years, demands for fingerprint sensing and similar biometric identification mechanisms have been gradually increased. The prior art includes several examples of dedicated fingerprint image sensing regions on a portable device (e.g. a smartphone) for such purpose. However, in order to reduce a size of an electronic device, a fingerprint sensing region is preferably designed to overlap with a display region of the electronic device. For example, an under-display fingerprint identification technique embeds fingerprint sensors within a display panel, and the fingerprint sensor may sense or capture a fingerprint image through the display panel. Examples of prior art devices are described in US Patent Publication No. 2009/0065717; and U.S. Pat. Nos. 10,558,838; 10,437,974; 10,282,579; 10,115,000 and 10,127,425 all which are hereby incorporated by reference. Generally, when a touch event such as fingerprint (or other object) identification happens, a touch sensing circuit may report it to an application processor of the electronic device via a specified interface. Next, the application processor controls a display driving circuit to drive the display panel and capture an image for fingerprint sensing. The application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information. The identification process for capturing and comparing fingerprints, including by optical and/or acoustic imaging of ridges and other epidermal features is well-known in the art.

Typically in the prior art the display panel is divided into a plurality of fingerprint sensing zones in a fingerprint sensing direction X by which the fingerprint sensing lines are arranged, as illustrated in FIG. 25A, FIG. 25B and FIG. 25C. FIG. 25A illustrates portions of two display panels that are respectively divided into a plurality of fingerprint sensing zones of different (but fixed) sizes in a fingerprint sensing direction X in the related art. The fingerprint sensing zones are also conventionally partitioned in the scan direction Y. The partition of the fingerprint sensing zones is determined in accordance with expected/target human fingerprint dimensions and is fixed/configured when the electronic device is manufactured. Accordingly, each fingerprint sensing zone in each the prior art display panel has a constant shape and size. In some use cases, a finger may touch multiple fingerprint sensing zones, and the fingerprint image correspondingly crosses over to adjacent touched fingerprint sensing zones in the fingerprint sensing direction X. In the prior art, a fingerprint sensing circuit receives and processes fingerprint sensing signals zone by zone, such that a cross-zone problem (see e.g., the boundary between zones 1810a and 1810b) is frequently raised when receiving the fingerprint sensing signals of a fingerprint image. In case of cross-zone receiving, the fingerprint sensing circuit must spend time for both switching and re-initialization.

This is shown in FIG. 25B and FIG. 25C. Zone crossing in the X-axis direction requires a long sensing time because each of the zones shares a common sensing circuit 25. Sensing a second zone Zone2 following sensing of a first zone Zone1 requires switching of a connection of the sensing circuit 25 from fingerprint sensing lines (FSLs) of the first zone Zone1 to FSLs of the second zone Zone2, and re-initiating the sensing circuit 25 for sensing the second zone Zone2. FIG. 25B and FIG. 25C show two cross-zone scanning techniques employed in the prior art. FIG. 25B scans the first zone Zone1 sequentially, that is, scanning fingerprint scan lines (GSLs) in the first zone Zone1 one by one, then switching to scan the second zone Zone2, with zone crossing once. FIG. 25C is relatively an inefficient method of scanning way because of multiple zone crossings.

For a prior art panel, a number N (equal to the number of channels which are sensed by an analog front end (AFE) and an analog to digital converter (ADC)) is designed to be able to cover the size of most fingerprints of people. N channels thus correspond to N FSLs arranged for a single zone, that is, one channel reads and receives signal from one FSL. An FPR RX switch 26 controls selection of which N FSLs to connect with the N channels of the sensing circuit 25. In a conventional scan operation, a first GSL is activated, and N fingerprint sensors controlled by the GSL are read out through the N channels of the sensing circuit 25 via their respective FSLs at the same time. Then the second GSL is activated in turn and the N fingerprint sensors on such line are read out, and then the third, and so on. The scan typically proceeds from top GSL to bottom GSL (or the reverse or any other sequence) for all the GSLs involved, irrespective of whether the GSLs belong to one or more predefined zones looking along the Y-axis direction. The selection of FSLs and GSLs is done on a zone basis in the prior art, that is to say, scan and sensing of fingerprint is always performed by activating and sensing each and every GSL and FSL of fixed sized selected zones. This process, therefore, can take significant time depending on a size of a zone, a number of fingerprint images, and a number of zone cross-overs, all of which are not within the control of the user.

Delays in fingerprint sensing lead to frustration and annoyance by users of devices that employ this kind of biometric sensing and authentication. As such devices increase their usage of fingerprint based access and authentication (including with multi-image authentication) and identification of other objects, this problem is expected to increase as well.

SUMMARY OF THE INVENTION

There is a need, therefore, for a solution to the main prior art problem of data capture and processing delays in fingerprint sensing and identification based on evaluation of image data.

The invention is directed to an imaging control circuit, capable of providing an efficient method for fingerprint sensing and identification and good user experience for users. In addition, a method of capturing object image data for an object presented on a portion of a surface of a display panel is also provided.

The invention provides an imaging control circuit for collecting object image data for an object presented on a portion of a surface of a display panel. The imaging control circuit includes a first circuit, a second circuit, and a third circuit. The first circuit is adapted to receive touch sensing signals from a set of touch sensors located in the display panel. The second circuit is adapted to receive object image sensing signals from a set of imaging sensors. The object image sensing signals are associated with the object detected on the surface of the display panel. The third circuit is adapted to determine a location of the object from the touch sensing signals. The third circuit is to generate a variable sized object imaging zone based on a location and a size of an object image. The variable sized object imaging zone includes a variable subset of the imaging sensors.

The invention provides an imaging control circuit for controlling image scanning of a human appendage presented on a portion of a surface of a display panel which includes both input and output capability. The imaging control circuit includes a touch circuit, an imaging circuit, and a scanning control circuit. The touch circuit is adapted to receive touch sensing signals detected from the human appendage by a set of touch sensors located in the display panel. The imaging circuit is adapted to receive appendage image sensing signals associated with an appendage image by a set of image sensors located in the display panel. The scanning control circuit is coupled to the touch circuit and the imaging circuit. The scanning control circuit is adapted to determine a location and at least one boundary of the appendage image from one or more of the set of touch sensors; and to generate an appendage imaging zone based on the determined location of the appendage image. The appendage imaging zone includes a variable number of appendage image sensing signals extending from the at least one boundary and spanning a width of the appendage image. The scanning control circuit is adapted to collect appendage image data from the appendage imaging zone.

The invention provides a method of capturing object image data for an object presented on a portion of a surface of a display panel. The method includes: processing touch sensing signals from a set of touch sensors located in the display panel to identify a touch event; processing object image sensing signals from a set of imaging sensors, which the object image sensing signals are associated with the object detected on the surface of the display panel; determining a location of the object from the touch sensing signals; and generating a variable sized object imaging zone based on the location and size of an object image. The variable sized object imaging zone includes a variable subset of the imaging sensors.

A method for controlling image scanning of a human appendage presented on a portion of a surface of a display panel which includes both input and output capability. The method includes: receiving touch sensing signals indicating a touch event detected from the human appendage by a set of touch sensors located in the display panel; receiving appendage image sensing signals indicating detection of an appendage image by a set of image sensors also located in the display panel; determining a location and at least one boundary of the appendage image from one or more of the set of touch sensors; generating an appendage imaging zone based on the determined location of the appendage image, wherein the appendage imaging zone includes a variable number of the appendage image sensing signals extending from the at least one boundary and spanning a width of the appendage image; and collecting appendage image data from the appendage imaging zone.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENTS

The embodiments below are provided to describe the disclosure in detail, though the disclosure is not limited to the provided embodiments, and the provided embodiments can be suitably combined. The term "coupling/coupled" or "connecting/connected" used in this specification (including claims) of the application is intended to be interpreted broadly and may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Embodiments of the present invention help ameliorate the sensing delays in prior art techniques by use of flexible formed fingerprint sensing zones. Instead of using sensing zones from predetermined ones, the panel is logically divided so that no fixed partitions are formed in at least a first direction (X-axis direction), while leaving partitions undisturbed in a second direction (Y-axis direction). Touch sensors are then used to determine the location and/or area (TSA) of a fingerprint. This determination consequently controls which FSLs should be elected to form a flexible located sensing zone of either fixed or variable size in the X-axis direction. The selection is thus line-based (by a single FSL) and not zone-based, and does not require aligning with a predefined zone boundary, such that it never crosses over different zones in the X-axis direction.

Figure 1:
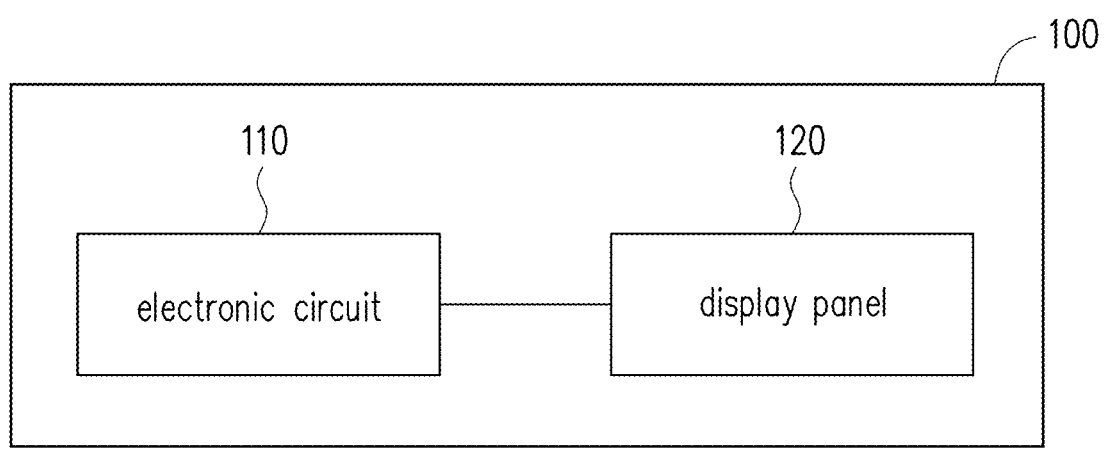
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is adapted to drive the display panel 120. It will be understood by those skilled in the art that device 100 may have other components not shown, and that it may be incorporated into a larger system (also not shown).

In the present embodiment, the electronic device 100 may be an electronic device having a display function, and biometric identification features, such as a touch sensing function, a fingerprint sensing function and other I/O functions known in the art. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or non-portable electronic device incorporated within a vehicle intelligent system. In an embodiment, the electronic device 100 may be, but not limited to, intelligent home appliances such as, a television, a computer, a refrigerator, a washing machine, a telephone, an induction cooker, a table lamp and other similar devices that benefit from biometric access control, including by human fingerprints.

Figure 2:
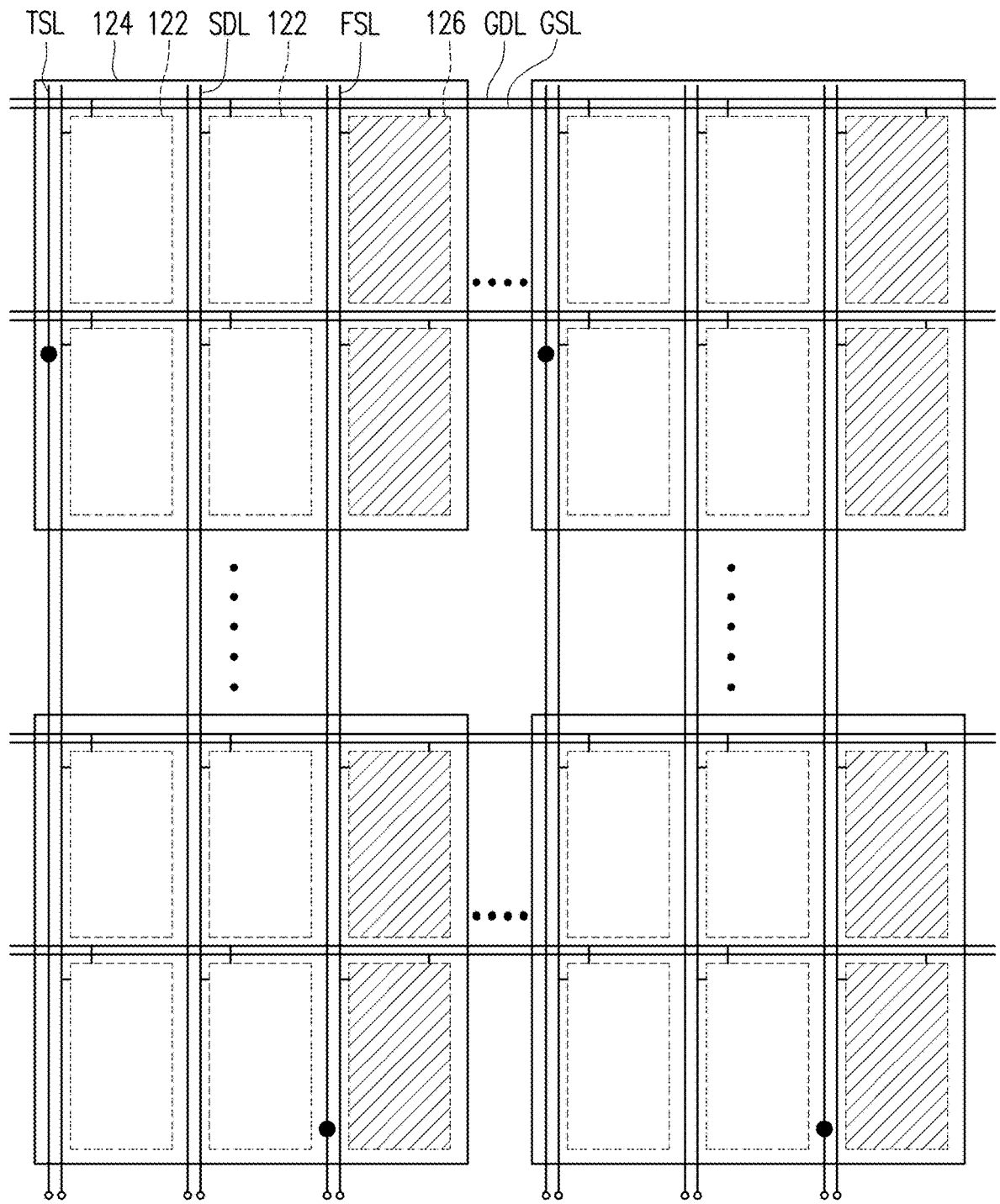
FIG. 2 is a schematic diagram illustrating portions of the display panel depicted in FIG. 1.

FIG. 2 is a schematic diagram illustrating portions of the display panel 120 depicted in FIG. 1. Referring to FIG. 2, the display panel 120 of the present embodiment preferably includes at least a plurality of display pixels 122, a plurality of touch sensors 124 and a plurality of fingerprint sensors (imaging sensors) 126. Note that the individual elements and sense lines are shown for reference purposes only, and are not drawn to scale or intended to denote a required size, orientation or relationship. The electronic circuit 110 (FIG. 1) drives and preferably controls the display panel 120 to perform a display operation, and biometric measurement operations, including at least a touch sensing operation and a human fingerprint (or other similar appendage with physically distinctive detectable features) sensing operation.

It will be understood, of course that other objects may be sensed and imaged within display panel 120 (including printed articles or items) as required by an application process. For example, instead of using a camera or magnetic reader, a credit card or similar article may be imaged using panel 120.

In particular, a primary function of the electronic circuit 110 is that it drives and controls the display pixels 122 to display visible images to a user via display scan lines GDL and display data lines SDL in a manner well-known in the art. The electronic circuit 110 also drives and controls the touch sensors 124 to sense a touch event of the display panel 120 via touch driving lines and touch sensing lines TSL, also using techniques known in the art. In an embodiment, the touch sensors 124 may be touch sensing electrodes in a touch sensing phase, and the touch sensors 124 may be common electrodes in a display phase.

In the present embodiment, in-cell self-capacitance touch sensors are depicted in FIG. 2 as a preferred example. For in-cell self-capacitance touch sensors, the display panel 120 also relies on touch sensing lines TSL for transmitting touch driving signals. For other types of touch sensors, the display panel 120 may have separate touch driving lines for transmitting touch driving signals. Finally, the electronic circuit 110 is also responsible for driving and controlling the object detection (in this preferred example, a human fingerprint) sensors, i.e. the fingerprint sensors 126, to sense a fingerprint image presented or impinging on the display panel 120 via fingerprint scan lines GSL and fingerprint sensing lines FSL.

It will be understood that the display panel 120 may be an in-cell fingerprint, touch and display panel such that the fingerprint sensors and the touch sensors are embedded, but the invention is not limited thereto. In an embodiment, the electronic circuit 110 preferably drives and controls the electronic device 100 to perform an in-display object identification operation, including a biometric identification for a human fingerprint. The object detection sensors (including for a fingerprint), i.e. the fingerprint sensors 126, in a preferred embodiment are optical based, but it will be understood that other types of sensors, including acoustic-based, can be used to identify and develop an object image based on physical features of such item.

Figure 3:
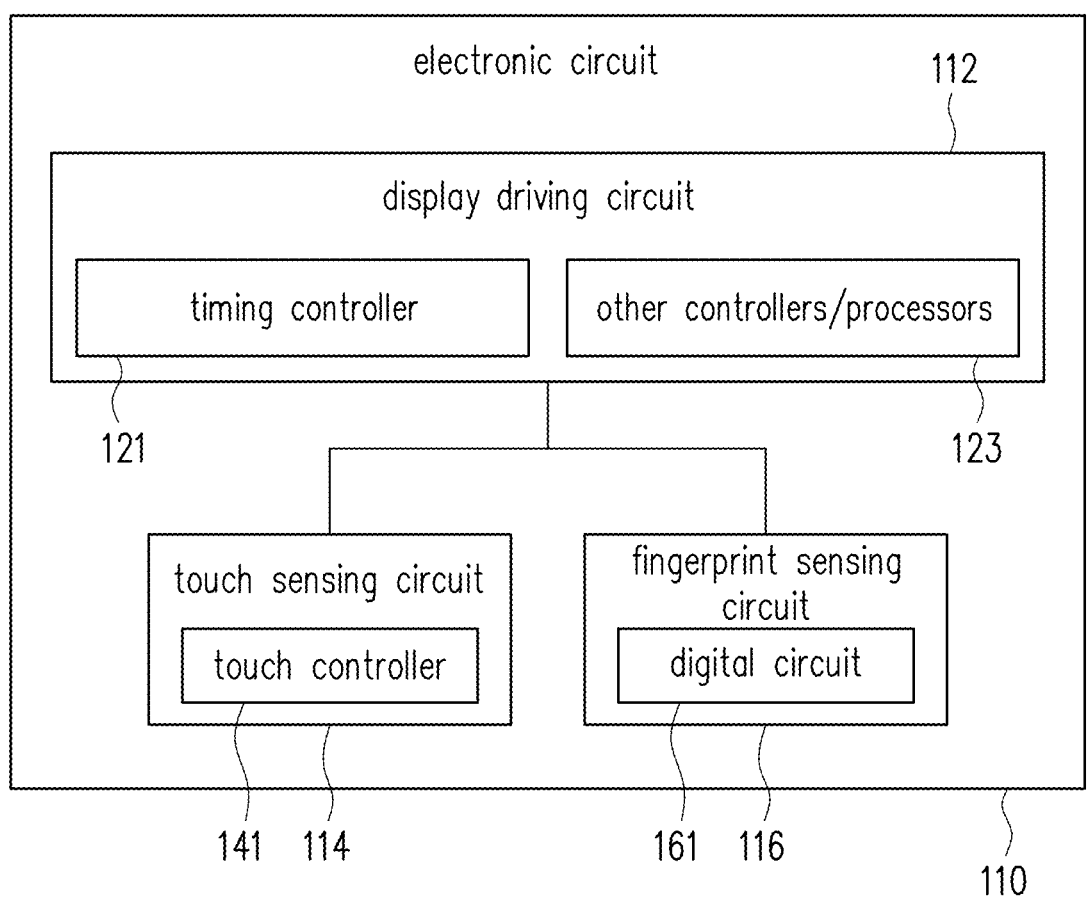
FIG. 3 is a schematic block diagram illustrating key components of the electronic circuit depicted in FIG. 1.

FIG. 3 is a schematic block diagram illustrating key components of the electronic circuit 110 depicted in FIG. 1. Referring to FIG. 3, the electronic circuit 110 preferably includes a display driving circuit 112, a touch sensing circuit (a first circuit) 114 and an object (fingerprint in this case) sensing circuit (a second circuit) 116. As noted above, a display driving circuit 112 is configured to drive and control the display pixels 122 to display images via the display scan lines GDL and the display data lines SDL. The display driving circuit 112 may include a timing controller, a display driver and other functional circuits for the display operation. The touch sensing circuit 114 is configured to drive and control the touch sensors 124 to sense the touch event of the display panel 120 via the touch sensing lines TSL. The touch sensing circuit 114 may include a touch controller, an analog front end (AFE) circuit, an analog-to-digital converter (ADC) circuit and other functional circuits (not shown) for the touch sensing operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 preferably includes a digital circuit, an AFE circuit, an ADC circuit and other functional circuits appropriate for a particular object sensing operation, including specifically for a fingerprint sensing operation.

The display driving circuit 112, the touch sensing circuit 114 and the fingerprint sensing circuit 116 communicate with one another preferably via signal transmission interfaces, such as Mobile Industry Processor Interface (MIPI), Inter-Integrated Circuit (I2C) Interface, Serial Peripheral Interface (SPI) and/or other similar or suitable interfaces.

In an embodiment, the display driving circuit 112, the touch sensing circuit 114 and the fingerprint sensing circuit 116 may be formed in a single semiconductor chip or on different semiconductor chips. For example, the display driving circuit 112, the touch sensing circuit 114 and the fingerprint sensing circuit 116 may be formed in a single semiconductor chip that can drive and control the display panel 120 to perform the display operation, the touch sensing operation and the fingerprint sensing operation. In this case, the electronic circuit 110 may include a control circuit 130 (a third circuit), and the control circuit 130 may be a micro-controller based core to perform all of control activities of the display operation, the touch sensing operation and the fingerprint sensing operation. The control circuit 130 may include at least one of the timing controller 121, a touch controller 141, a digital circuit 161, and the other controllers or processors 123 of the display driving circuit 112.

For another example, the display driving circuit 112 and the touch sensing circuit 114 may be formed in a first semiconductor chip that can drive and control the display panel 120 to perform the display operation and the touch sensing operation, and the fingerprint sensing circuit 116 may be formed in a second semiconductor chip which is different from the first semiconductor chip. The second semiconductor chip can drive and control the display panel 120 to perform the fingerprint sensing operation.

For another example, the display driving circuit 112, the touch sensing circuit 114 and the fingerprint sensing circuit 116 may be formed in different semiconductor chips that can drive and control the display panel 120 to perform the display operation, the touch sensing operation and the fingerprint sensing operation, respectively. Other implementations will be apparent to those skilled in the art. In some cases the individual chips are packaged to be suitably mounted on, near or with the display panel 120 (or components thereof) to improve integration aspects of device 100.

Figure 4:
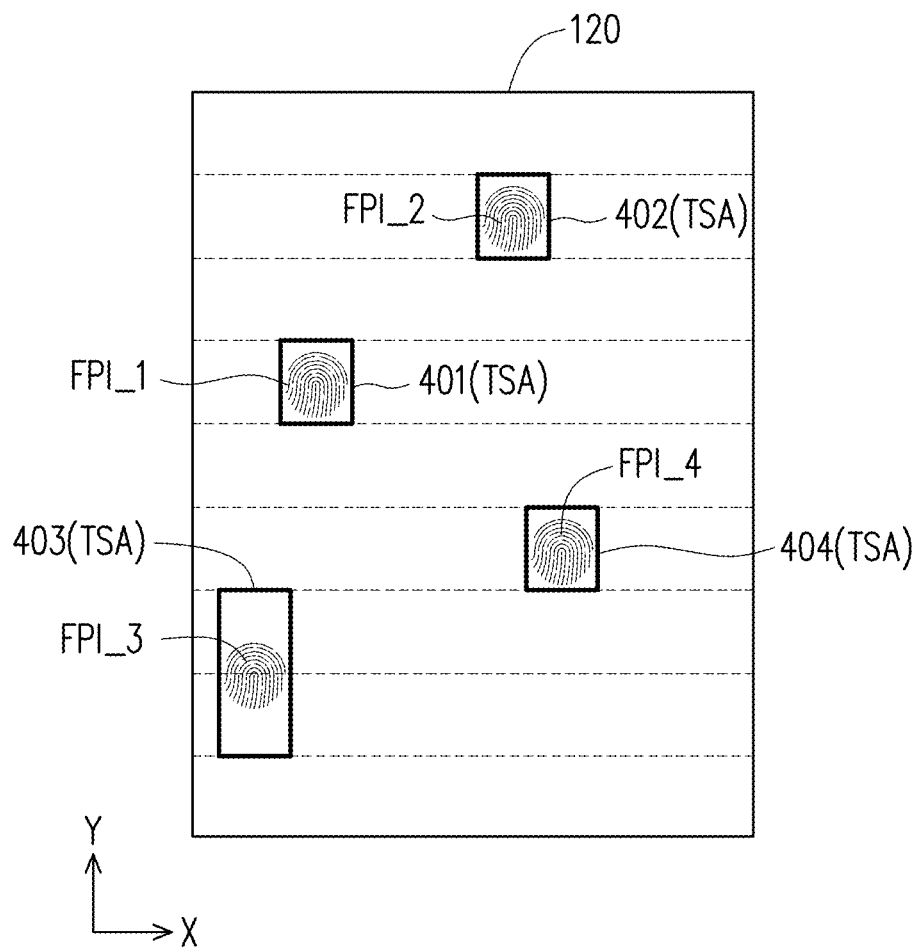
FIG. 4 is a schematic diagram illustrating a typical display panel operating with integrated fingerprint sensing according to an embodiment of the invention.

FIG. 4 is a schematic diagram illustrating a typical display panel 120 operating with integrated fingerprint sensing according to an embodiment of the invention. Referring to FIG. 1, FIG. 3 and FIG. 4, the electronic circuit 110 may drive and control the display panel 120 to sense one or more fingerprint images FPI_1, FPI_2, FPI_3 and FPI_4 as detected and presented on the display panel 120.

It will be understood that the detection of the object (fingerprint) and imaging may be performed in any number of ways known or expected to be developed in the art, and the invention is not limited in this respect. For example, the fingerprint may not need to be physically impinging on the surface at the time of image capture. In the present embodiment, the fingerprint sensing lines FSL run/extend in the Y-axis direction, e.g. the vertical direction and are arranged in parallel, side by side in the X-axis direction, e.g. the horizontal direction, as shown in FIG. 2.

Figure 25A:
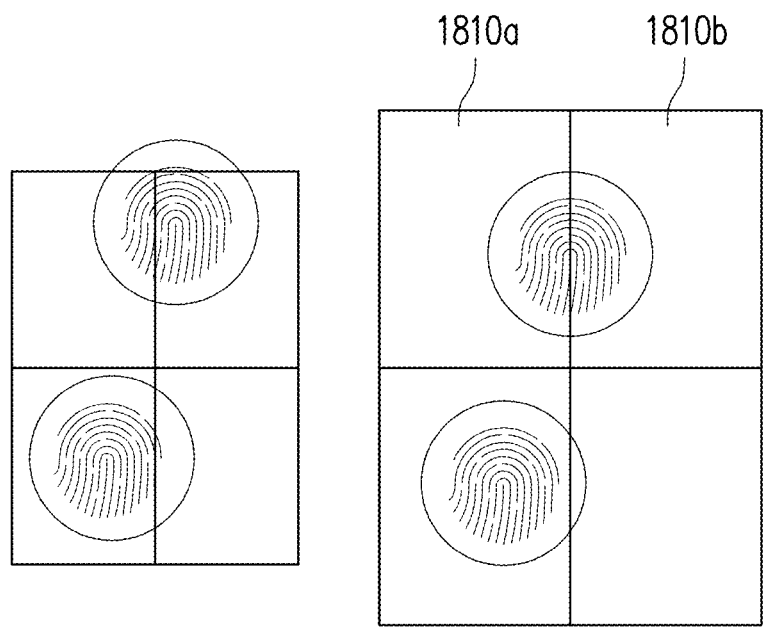
FIG. 25A illustrates portions of two display panels that are respectively divided into a plurality of fingerprint sensing zones of different (but fixed) sizes in a fingerprint sensing direction X in the related art.
Figure 25C:
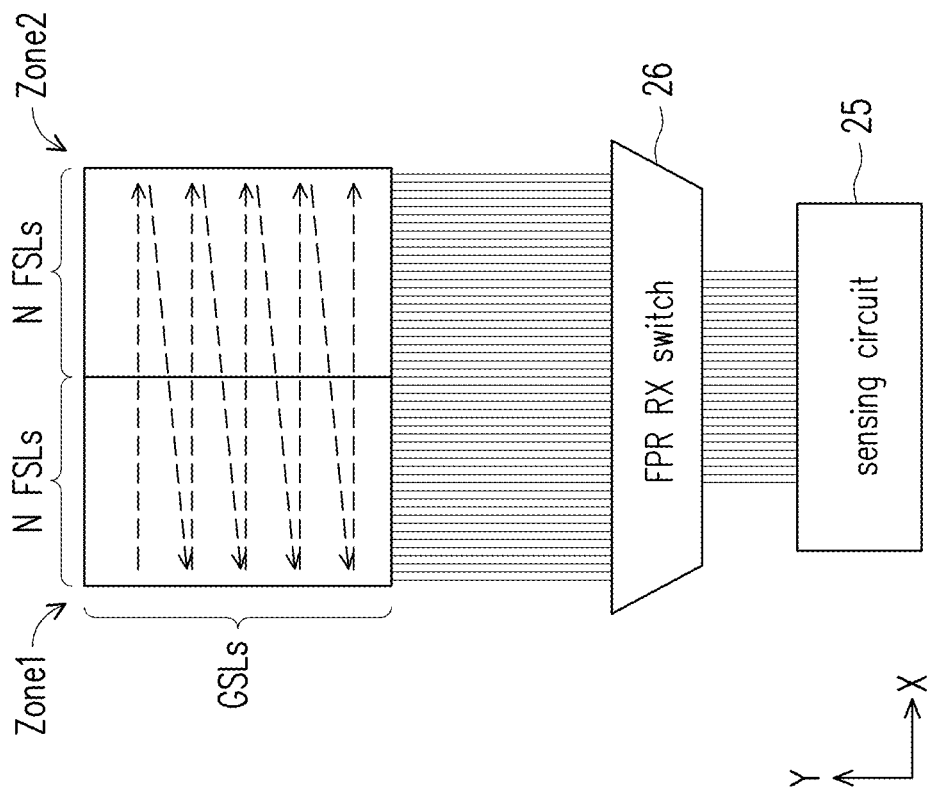
FIG. 25B and FIG. 25C show two cross-zone scanning techniques employed in the prior art.
Figure 25B:
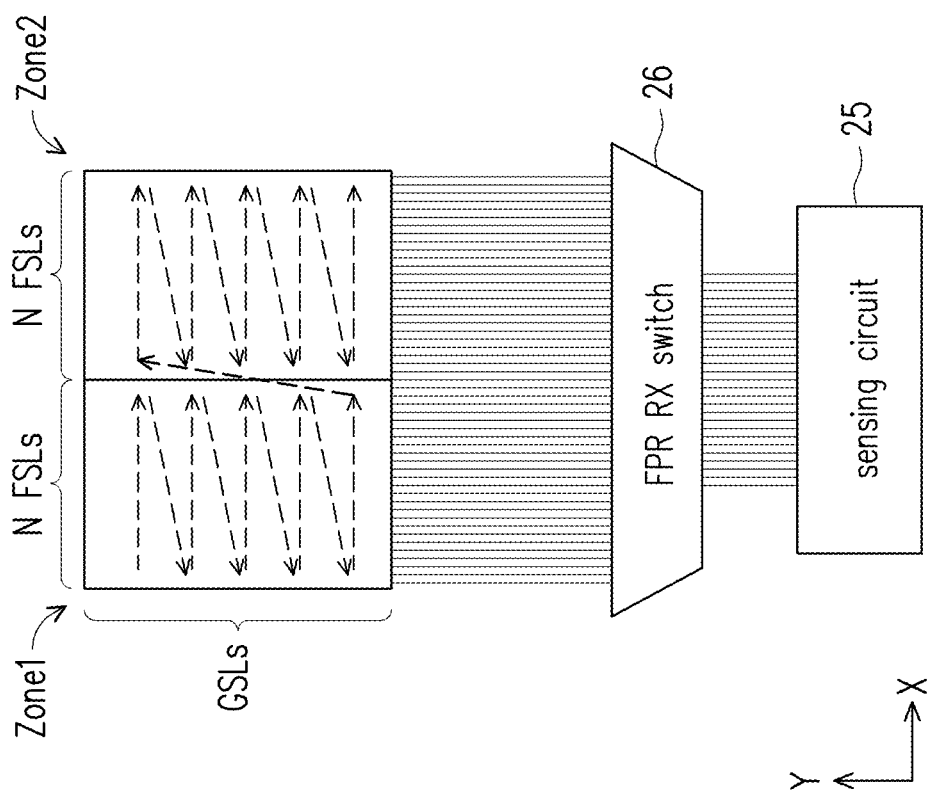

As alluded to above, in preferred embodiments of the invention, the display panel 120 is not fixedly (hard) partitioned in advance into fingerprint sensing zones for fingerprint sensing in at least the X-axis direction. That is to say, the display panel 120 has no predetermined, fixed size or shaped fingerprint sensing zones for the fingerprint sensing lines FSL in the X-axis direction. In contrast, the prior art, as illustrated in FIG. 25A, configures the display panel 120 in advance with fixed partitioning for the fingerprint sensing zones which must be used for fingerprint sensing in the X-axis direction. In such an approach the touch sensors determine the area of the fingerprint—which may fall in more than one zone in X-axis direction and/or Y-axis direction—and then each and all of these fixed sized zones overlapped by a part of the fingerprint image have to be selected and sensed to obtain the fingerprint image.

The fingerprint sensing zones 401, 402, 403 and 404 (fixed or variable sized) of the present embodiment can be flexibly formed for fingerprint sensing by selecting a subset of the fingerprint sensing lines FSL among a plurality of the set of fingerprint sensing lines FSL arranged all over the display panel 120. Each of the fingerprint sensing lines FSL is selectable to be edges or boundaries of the fingerprint sensing zones 401, 402, 403 and 404. As there are no predetermined zones in the X-axis direction, there is no need to perform a cross over (with attendant delays) to process a different zone during a sensing process.

To be specific, a control circuit of the touch sensing circuit 114, e.g. a touch controller, preferably determines one or more touch areas TSA corresponding to a touch event resulting from a fingerprint image FPI_1, FPI_2, FPI_3 and FPI_4 based on a detected touch sensing signal. The touch controller 141 (as illustrated in FIG. 3) preferably determines an individual size range for each of the individual touch areas TSA. Alternatively, the touch controller 141 may simply determine coordinate information indicating a location of each of the touch areas TSA and informs the fingerprint sensing circuit 116 of the coordinate information for the detected fingerprints. In this case, each of the touch areas TSA is assigned with a predetermined size. The determined touch area TSA defines a nominal fingerprint sensing zone for covering a fingerprint image. The fingerprint sensing zone (FSZ) may be sized and/or shaped to cover a portion or a full range of the object (fingerprint) image, depending on the application. For example, either a limited feature-sufficient portion of the image or the full range of the input fingerprint image may be sensed for the FSZ, depending on which is necessary to achieve a desired confidence level—i.e., to convey sufficient fingerprint features/information for fingerprint identification in accordance with requirements of a particular application. In a lower security application, for example, only a small portion of an object (fingerprint) may need to be imaged to determine a valid identification within a particular threshold or confidence level.

The touch controller 141 preferably instructs the fingerprint sensing circuit 116 to select a subset of the set of fingerprint sensing lines FSL and a subset of the set of fingerprint scan lines GSL for the fingerprint sensing operation according to the determined touch area TSA. That is, a portion/subset of the fingerprint sensing lines FSL collocated within an identified touch area TSA on the display panel 120 is preferably selected among the entire set of the fingerprint sensing lines FSL arranged all over the display panel 120. In the present embodiment, the selected part of fingerprint sensing lines FSL thus flexibly forms a single fingerprint sensing zone 401, 402, 403 or 404 having a size/range determined by the touch area TSA, such that only a single-scan is preferably required for receiving of fingerprint sensing signals in fingerprint sensing channels in the horizontal direction (X-axis direction) of the fingerprint image FPI_1, FPI_2, FPI_3 or FPI_4. It is thus possible to solve cross zone problem in receiving the fingerprint sensing signals of a fingerprint image FPI_1, FPI_2, FPI_3 or FPI_4 in the horizontal direction, dramatically reducing a fingerprint sensing time and improving an overall user experience.

Figure 5:
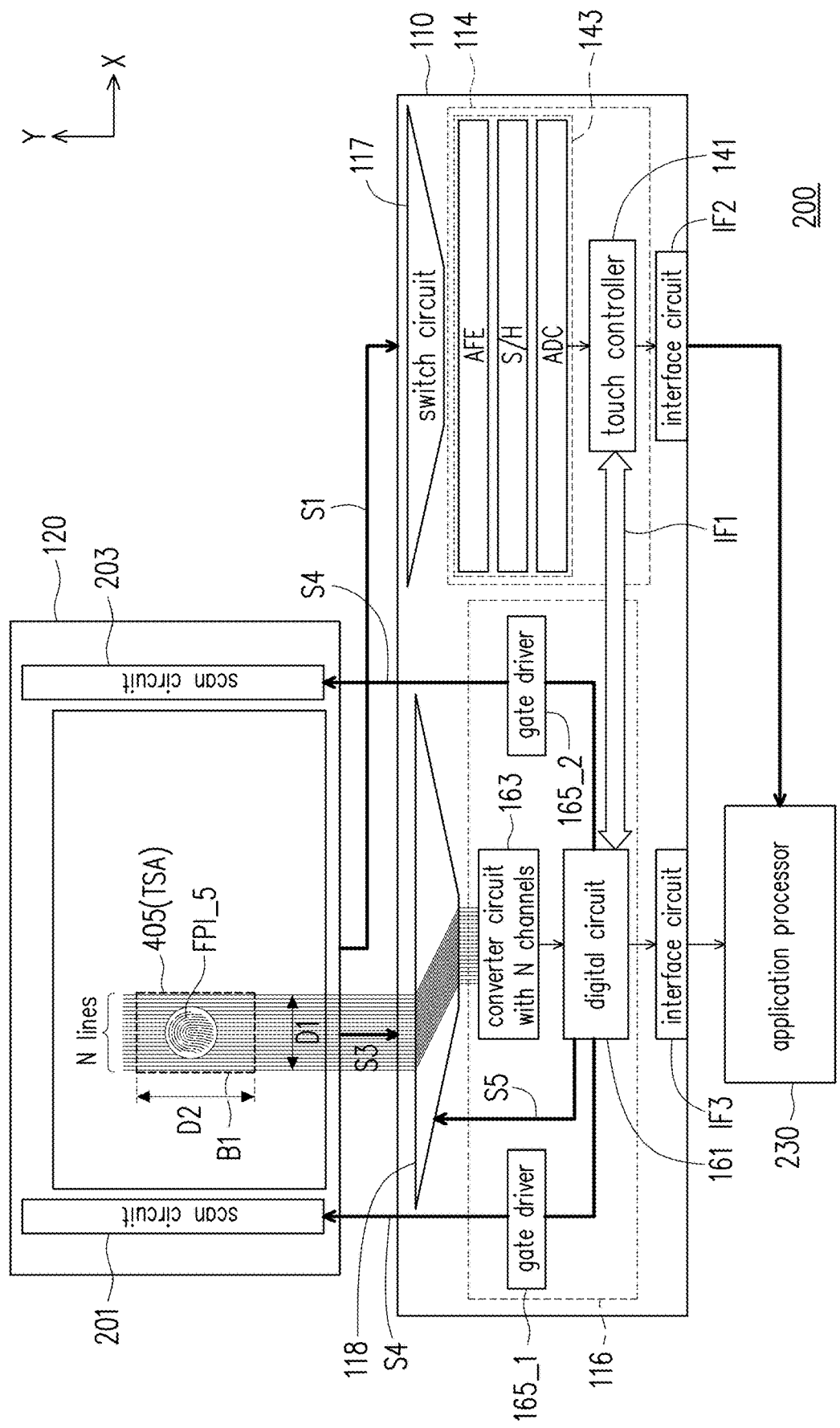
FIG. 5 is a schematic block diagram illustrating an electronic device according to another embodiment of the invention.

FIG. 5 is a schematic block diagram illustrating an electronic device according to another embodiment of the invention. Except where otherwise indicated, like referenced objects are intended to refer to counterparts identified above for other embodiments. Referring to FIG. 5, an electronic device 200 of the present embodiment preferably includes the electronic circuit 110, the display panel 120 and an application processor 230. In the present embodiment, the electronic circuit (imaging control circuit) 110 and the display panel 120 may be integrated within a portable electronic device 200 adapted to identify human fingerprints.

The electronic circuit 110 preferably includes the touch sensing circuit 114, the fingerprint sensing circuit 116, a plurality of interface circuits IF1, IF2 and IF3 and a plurality of switch circuits 117 and 118. A first interface circuit IF1 is preferably coupled between the touch sensing circuit 114 and the fingerprint sensing circuit 116. The touch sensing circuit 114 preferably communicates with the fingerprint sensing circuit 116 via the first interface circuit IF1. The second interface circuit IF2 is preferably coupled between the touch sensing circuit 114 and the application processor 230. The touch sensing circuit 114 preferably transmits touch information to the application processor 230 via the second interface circuit IF2. For simplicity and clarity, the display driving circuit 112 is not depicted in details in FIG. 5.

The display panel 120 preferably includes scan circuits 201 and 203. The scan circuits 201 and 203 are preferably coupled to the fingerprint sensors 126 via the fingerprint scan lines GSL. The fingerprint scan lines GSL (not shown in FIG. 5) preferably extend in a straight line along the direction of the X-axis. The scan circuits 201 and 203 are preferably configured to initiate a fingerprint scanning for a fingerprint sensing zone 405 (a variable sized object imaging zone) via the corresponding fingerprint scan lines GSL, so as to control the fingerprint sensors 126 of the fingerprint sensing zone 405 (a variable subset of the imaging sensors) to perform an optimized fingerprint sensing operation within a more appropriately sized, flexible sensing zone and thus using a reduced set of sensing elements compared to the prior art. Therefore, only the variable subset of the imaging sensors 126 is scanned to generate the object image having sufficient information for an object identification operation.

In the present embodiment, the electronic circuit 110 cooperates with the display panel 120 and the application processor 230 for a fingerprint identification operation, i.e. a fingerprint recognition operation or fingerprint authentication operation, which can be done in any appropriate manner known in the art in accordance with a desired confidence level. The third interface circuit IF3 is preferably coupled between the fingerprint sensing circuit 116 and the application processor 230. The fingerprint sensing circuit 116 preferably outputs a fingerprint image to the application processor 230 to perform the fingerprint identification operation via the third interface circuit IF3. Again, it will be understood by those skilled in the art that objects other than fingerprints may be imaged in the same manner. Also, the specific algorithmic imaging implementation for a fingerprint identification operation will vary in accordance with a particular application, and as details of such are well-known to those skilled in the art that are not repeated hereinafter. In addition, the interface circuits IF1, IF2 and IF3 may be Mobile Industry Processor Interfaces (MIPI), Inter-Integrated Circuit (I2C) Interfaces, Serial Peripheral Interfaces (SPI) and/or other similar or suitable interfaces, but the invention is not limited thereto.

The touch sensing circuit 114 is configured to receive a touch sensing signal S1 from the touch sensors 124 (FIG. 2). The touch sensing circuit 114 preferably includes a touch controller 141 and a converter circuit 143. The converter circuit 143 preferably includes an analog front end (AFE) circuit, a sample and hold (S/H) circuit and an analog-to-digital converter (ADC) circuit. The converter circuit 143 preferably receives the touch sensing signal S1 from the touch sensors 124 via the switch circuit 117. The switch circuit 117 is preferably adapted for multiplexing touch sensing signals S1 and display driving signals in respective touch sensing phases and display driving phases. The converter circuit 143 preferably converts the touch sensing signal S1 of an analog format into the touch sensing signal S1 of a digital format and transmits the touch sensing signal S1 of the digital format to the touch controller 141. The details for implementing converter circuit 143 are well-known to those skilled in the art (or would become apparent from the present teachings) and thus are not described specifically herein.

The touch controller 141 preferably receives the touch sensing signal S1 from the converter circuit 143 and determines the touch area TSA according to such signal. In the present embodiment, the touch area TSA is associated with and assigned a number N fingerprint sensing channels in the X-axis direction and also cover a number S (one or more) fingerprint scan zones in the Y-axis direction. The touch controller 141 informs the fingerprint sensing circuit 116 to select a subset of the fingerprint sensing lines FSL and a subset of the fingerprint scan lines GSL for fingerprint sensing operation according to the determined touch area TSA. For example, the fingerprint sensing lines FSL and the fingerprint scan lines GSL (see FIG. 2) in an area encompassed and corresponding to the fingerprint sensing zone 405 are selected to perform the fingerprint sensing operation. In the present embodiment, the preferred number of the fingerprint sensing channels is N, where N is a positive integer and can be a predetermined fixed number or varies based on the detected object size in the X-direction. Again it will be understood that for some applications, a number less than a full range (N) may only be required.

The fingerprint sensing circuit 116 is preferably configured to receive a fingerprint sensing signal S3 corresponding to a fingerprint image FPI_5 from the fingerprint sensors 126 via the selected part of the fingerprint sensing lines FSL and the switch circuit 118. The fingerprint sensing circuit 116 preferably includes a digital circuit 161, a converter circuit 163 and gate drivers 165_1 and 165_2.

The converter circuit 163 preferably converts the fingerprint sensing signal S3, (typically an indicator of a physical feature expressed in optical or acoustic form or transformed into electrical form) in an analog format into a fingerprint sensing signal S3 of a digital format and transmits the fingerprint sensing signal S3 of the digital format to the digital circuit 161. The converter circuit 163 preferably includes a plurality N of fingerprint sensing channels coupled to the switch circuit 118. The fingerprint sensing channels receive the corresponding fingerprint sensing signal S3 from the selected part of the fingerprint sensing lines FSL. Preferably, the fingerprint sensing signal S3 (which is a data item N sense lines wide) carried on the selected part of the fingerprint sensing lines FSL is read out and received by the fingerprint sensing channels at the same time, based on a scan line period. Each of the N fingerprint sensing channels preferably includes an AFE circuit and/or an ADC circuit. In the present embodiment, the converter circuit 163 may handle a set of N fingerprint sensing lines, taken as a subset from display panel 120 which may include a total set of M fingerprint sensing lines FSL, where N and M are positive integers, and M is larger than N. That is to say, the number M of the total set of the fingerprint sensing lines FSL is larger than the number N of the fingerprint sensing channels. The details and operation of converter circuit 163 are well-known in the art (or would become apparent from the present teachings) and as such are not disclosed herein.

Figure 6:
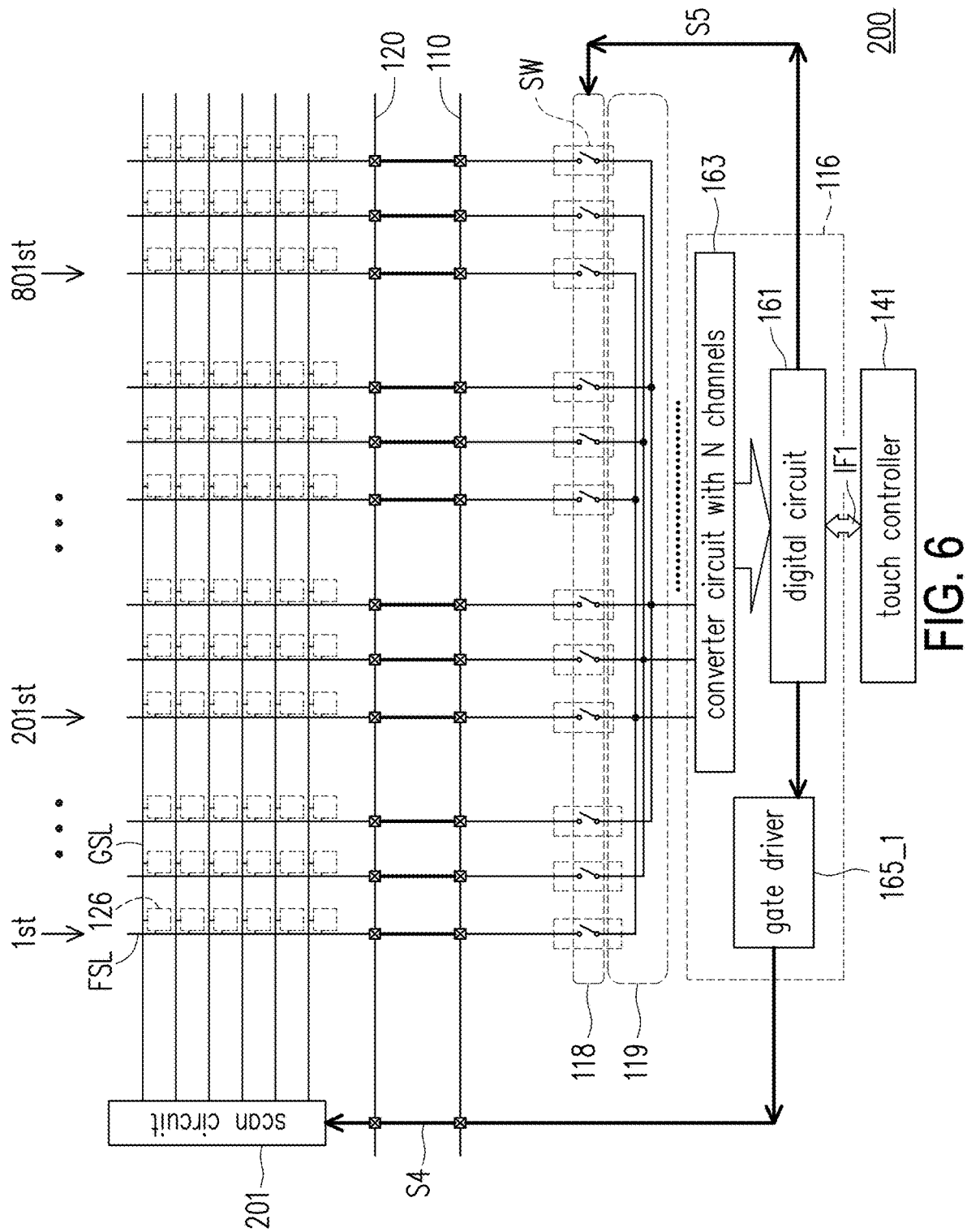
FIG. 6 is a schematic diagram illustrating a more detailed structure of a preferred switch circuit 118 depicted in FIG. 5 according to an embodiment of the invention.

The touch controller 141 communicates with the digital circuit 161 via the first interface circuit IF1. The digital circuit 161 preferably controls the switch circuit 118 to select a subset of the fingerprint sensing lines for the fingerprint sensing operation via a control signal S5. For example, N fingerprint sensing lines preferably collocated with the touch area TSA on the display panel 120 are selected among M fingerprint sensing lines arranged all over the display panel 120. The switch circuit 118 is coupled to the fingerprint sensors 126 via the fingerprint sensing lines FSL. The switch circuit 118 is preferably configured to receive the fingerprint sensing signal S3 from the fingerprint sensors 126 via the selected fingerprint sensing lines FSL. The switch circuit 118 preferably includes a plurality of switches, and each of the switches is associated with a fingerprint sensing line FSL as depicted in FIG. 6. The digital circuit 161 preferably controls the switch circuit 118 to turn on a subset of the plurality of switches corresponding to the N fingerprint sensing lines to establish coupling between the set of N fingerprint sensing lines and the N fingerprint sensing channels of the converter circuit 163 for the fingerprint sensing operation. Furthermore digital circuit 161 preferably controls the switch circuit 118 to turn off the rest of the plurality of switches corresponding to the remaining fingerprint sensing lines that are not selected. For example, the switches corresponding to the unselected M-N fingerprint sensing lines preferably are turned off.

The digital circuit 161 controls gate drivers 165_1 and 165_2 to drive the scan circuits 201 and 203 to initiate the fingerprint scanning for the fingerprint sensing zone 405 preferably via a driving signal S4. In an embodiment, the fingerprint sensing circuit 116 preferably includes a gate driver, and the number of the gate drivers does not intend to limit the invention. The operation and hardware structures of the gate drivers 165_1 and 165_2 and the scan circuits 201 and 203 is well-known to those skilled in the art (or would become apparent from the present teachings) and therefore is not described herein.

In the present embodiment, the determined touch area TSA defines a nominal or target fingerprint sensing zone 405 to be used for covering an extent of an object (in a preferred example a fingerprint) image. A subset of the fingerprint sensing lines FSL and a subset of the fingerprint scan lines GSL are preferably selected for fingerprint sensing operation according to the determined touch area TSA. Similarly, a corresponding subset of switches corresponding to the subset of fingerprint sensing lines FSL is turned on to couple such subset of fingerprint sensing lines FSL to respective fingerprint sensing channels to have such channels receive a composite fingerprint sensing signal S3. A subset N of the fingerprint sensing lines FSL collocated with the touch area TSA on the display panel 120 is selected among a plurality M of the fingerprint sensing lines FSL arranged all over the display panel 120. In the present embodiment, the selected part of fingerprint sensing lines FSL preferably flexibly forms a single fingerprint sensing zone 405 having a size, shape and range determined by the touch area TSA, and the fingerprint sensing signals S3 carried on the selected part of fingerprint sensing lines FSL for a single GSL may be read out at the same time, and further preferably such that only a single-turn receiving of fingerprint sensing signals in fingerprint sensing channels is required for the horizontal direction (X-axis direction) of the fingerprint image FPI_5. The time for fingerprint sensing compared to the prior art is thus reduced.

In an embodiment, the electronic circuit 110 is implemented in a single semiconductor chip. In another embodiment, the electronic circuit 110 is implemented in at least two semiconductor chips. The at least two semiconductor chips include a first semiconductor chip and a second semiconductor chip. The first semiconductor chip includes the touch sensing circuit 114. The second semiconductor chip includes the fingerprint sensing circuit 116. The second semiconductor chip may also include the switch circuit 118.

Regarding hardware structures of the components in the embodiment of FIG. 5, the touch controller 141 and the digital circuit 161 are preferably programmable processors having computational capability. Alternatively, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC).

FIG. 6 is a schematic diagram illustrating a more detailed structure of a preferred switch circuit 118 depicted in FIG. 5 according to an embodiment of the invention. Referring to FIG. 6, the switch circuit 118 is controlled by the digital circuit 161. The switch circuit 118 includes a plurality of switches SW. The switches SW can be separately controlled. The digital circuit 161 determines which switches to be turned on or turned off according to the touch area TSA. The enabled switches SW establish the coupling and association between the fingerprint sensing lines FSL and the fingerprint sensing channels for the fingerprint sensing operation.

In the present embodiment, the electronic circuit 110 further includes a wire grouping circuit 119 coupled between the switch circuit 118 and the converter circuit 163 for reducing the circuit area. The wire grouping circuit 119 groups each of the fingerprint sensing lines FSL into a plurality of groups, which are correspondingly connected to respective fingerprint sensing channels in the converter circuit 163. For example, the converter circuit 163 is preferably configured to have 200 fingerprint sensing channels given a nominal number of the fingerprint sensing lines FSL equal to 1000. In this configuration, the first (1st) fingerprint sensing line, the $201^{th}$ fingerprint sensing line, the $401^{th}$ fingerprint sensing line, the $601^{st}$ fingerprint sensing line and the $801^{st}$ fingerprint sensing line are connected with one another as part of a common logical group via the corresponding switches SW and the wire grouping circuit 119 and therefore coupled to a first fingerprint sensing channel (or subchannel if it is considered that the entirety of the scanned image for one GSL line across all FSLs in the sensed zone is a channel). The wire grouping circuit 119 is preferably a wire-OR circuit to wire-OR multiple FSLs to a single corresponding sensing channel.

Similarly, the second fingerprint sensing line, the $202^{th}$ fingerprint sensing line, the $402^{th}$ fingerprint sensing line, the $602^{th}$ fingerprint sensing line and the $802^{th}$ fingerprint sensing line are connected with one another in the same group via the corresponding switches SW and the wire grouping circuit 119 and coupled to the second fingerprint sensing channel. The connection relationship of the remaining fingerprint sensing lines and their associated fingerprint sensing channels is performed in the same manner. By controlling the corresponding switches SW, the fingerprint sensing lines FSL within the same group are not shorted at the same time.

The number of the fingerprint sensing lines FSL, the number of the fingerprint sensing channels and the connection relationship of the fingerprint sensing lines FSL and the fingerprint sensing channels are not limiting. It will be understood by those skilled in the art that these parameters, including a pairing strategy and size of the logical groups can be adjusted as needed based on the display, expected object size, and other performance requirements.

Figure 7A:
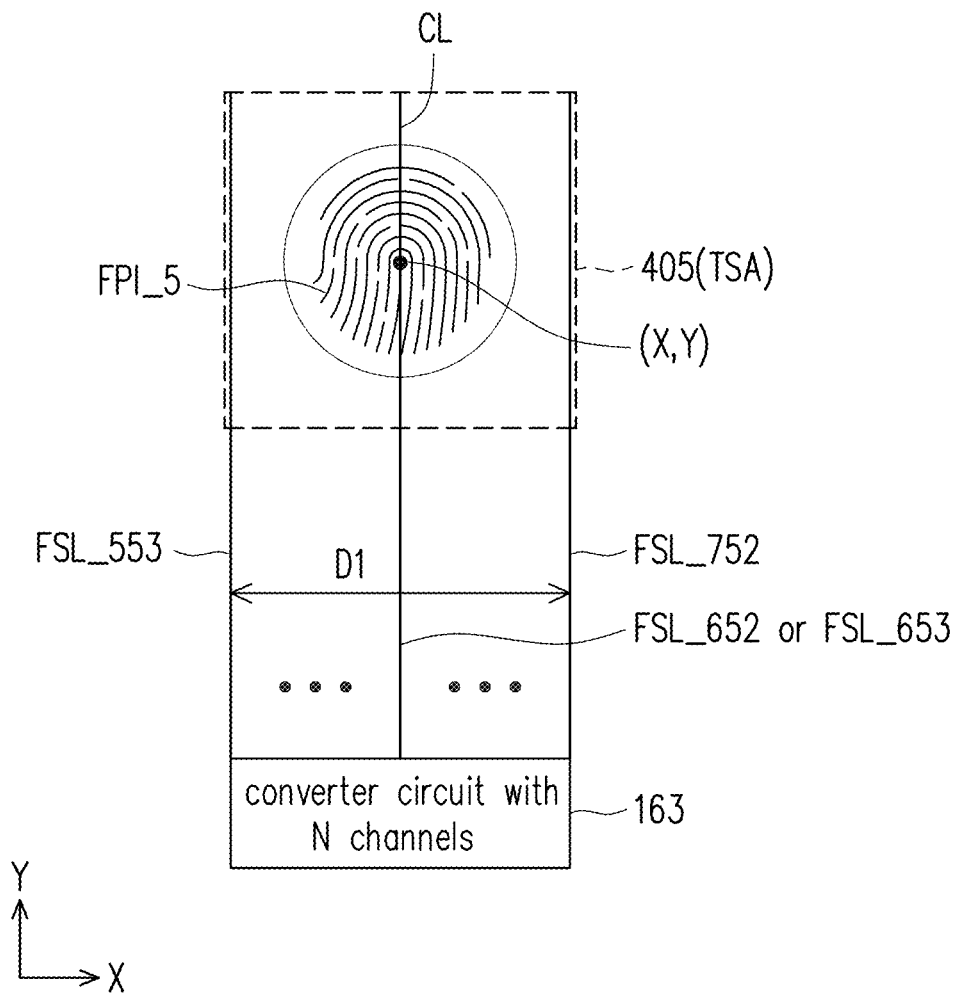
FIG. 7A is a schematic diagram illustrating structural aspects affected by a method for selecting the fingerprint sensing lines depicted in FIG. 5 according to an embodiment of the invention.

FIG. 7A is a schematic diagram illustrating structural aspects affected by a method for selecting the fingerprint sensing lines depicted in FIG. 5 according to an embodiment of the invention. Referring to FIG. 6 and FIG. 7A, for example, the converter circuit 163 may be designed to have 200 fingerprint sensing channels, and the number of the fingerprint sensing lines FSL is 1000. When the touch controller 141 determines the touch area TSA (including preferably with a location coordinate (X, Y) of (652, 305) indicating a center or near center of the touch area) it also informs the digital circuit 161 of such location coordinate information. Based on such location/touch sensor information the digital circuit 161 selects a set of 200 fingerprint sensing lines FSL from among 1000 fingerprint sensing lines FSL arranged all over the display panel 120 for fingerprint sensing, and each of the full range of the fingerprint sensing lines is selectable to be a boundary of the fingerprint sensing zone. For example, as seen in the example of FIG. 7A, based on the identified location for the detected object, the digital circuit 161 controls the switch circuit 118 to select a set of FSLs corresponding to the $553^{rd}$ fingerprint sensing line FSL_553 through the $752^{nd}$ fingerprint sensing line FSL_752 to form a fingerprint sensing zone 405 for fingerprint sensing. Digital circuit 161 generates this variable sized and shaped zone based on the X-axis coordinate information of the detected touch area TSA, where the $553^{rd}$ fingerprint sensing line (FSL_553) and the $752^{nd}$ fingerprint sensing line FSL_752 are selected to be respective edge boundaries of the fingerprint sensing zone 405. That is to say, the fingerprint sensing lines of the boundaries of the fingerprint sensing zone 405 are determined according to the touch area TSA. Again, the size of the sensing zones can be varied as required for any particular application.

In the present embodiment, the touch area TSA is identified and defined to include a full range of the fingerprint image FPI_5, and preferably with a center vertical line CL passing through the center or near center of the touch area TSA. The middle fingerprint sensing line FSL_652 or FSL_653 of the selected fingerprint sensing lines FSL_553 to FSL_752 is located on or near to the center vertical line CL of the determined touch area TSA. In this case, the fingerprint sensing line FSL_652 is located on the center vertical line CL of the determined touch area TSA, and the fingerprint sensing line FSL_653 is near to the center vertical line CL of the determined touch area TSA.

In addition, based on the Y-axis coordinate information of the determined touch area TSA, the digital circuit 161 further controls the gate drivers 165_1 and/or 165_2 to drive the scan circuits 201 and/or 203 (FIG. 5) to initiate the fingerprint scanning for the fingerprint sensing zone 405 via the driving signal S4 in a vertical direction (Y-axis direction).

Figure 7B:
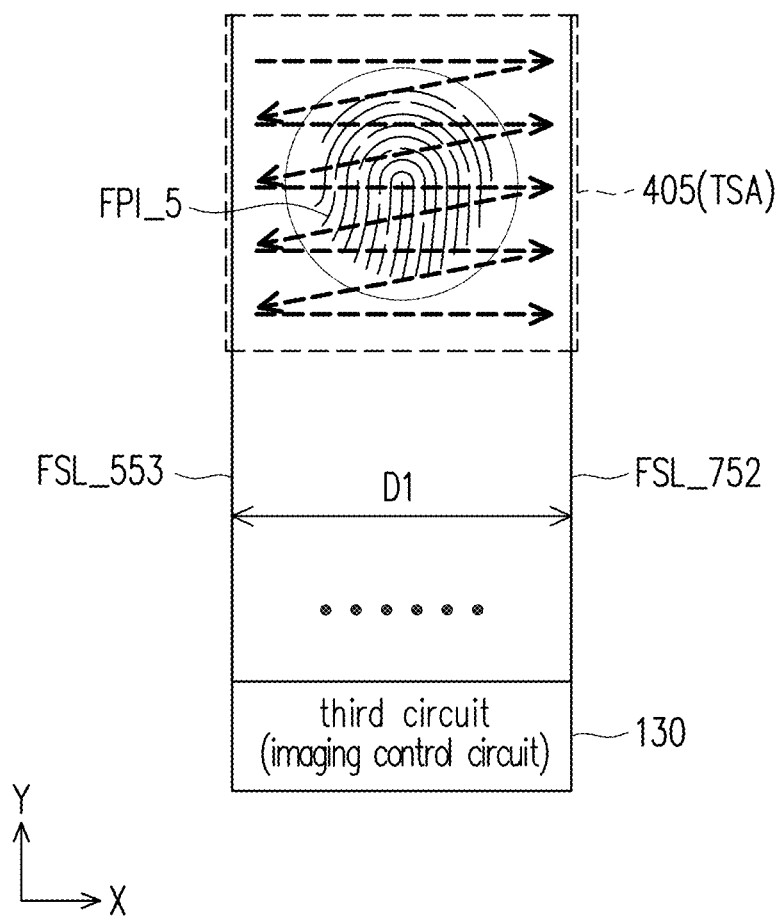
FIG. 7B illustrates an example of scanning a fingerprint sensing zone according to an embodiment of the invention.

FIG. 7B illustrates an example of scanning a variable sized object imaging zone according to an embodiment of the invention. Referring to FIG. 7B, the third circuit 130 is adapted to scan an entirety of the object image FPI_5 in the variable sized object imaging zone 405. No zone-crossing scanning is required. Also, the third circuit 130 controls scanning of the variable subset of the imaging sensors 126 extending from a boundary FSL_553 associated with the variable sized object imaging zone 405. In an embodiment, the third circuit 130 may generate the object image FPI_5 from the object image sensing signals S3 before sending the object image sensing signals S3 to the application processor 230.

Figure 21:
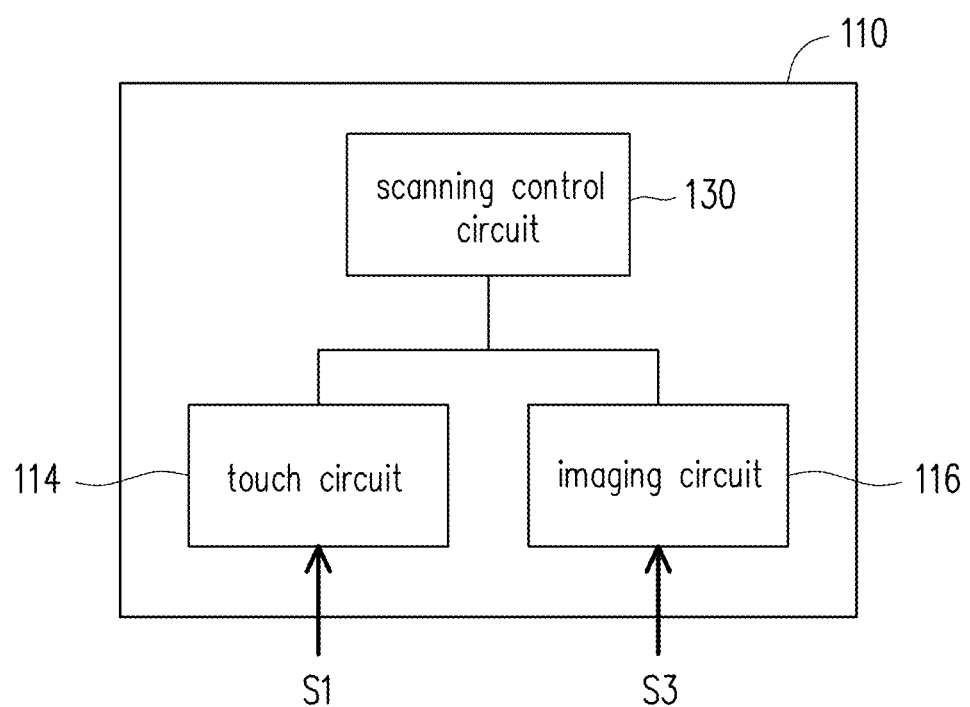
FIG. 21 is a schematic block diagram illustrating key components of an imaging control circuit depicted in FIG. 18 according to another embodiment of the invention.

Taking the imaging control circuit 110 of FIG. 21 as an example, the imaging control circuit 110 is adapted to sense data for the entire appendage image FPI_5 in a single scan of selected image sensors 126 in the appendage imaging zone 405. The scanning control circuit 130 reduces capture time for the appendage image FPI_5 by sensing only the variable number of the appendage image sensing signals S3 selected for the appendage imaging zone 405.

Figure 8:
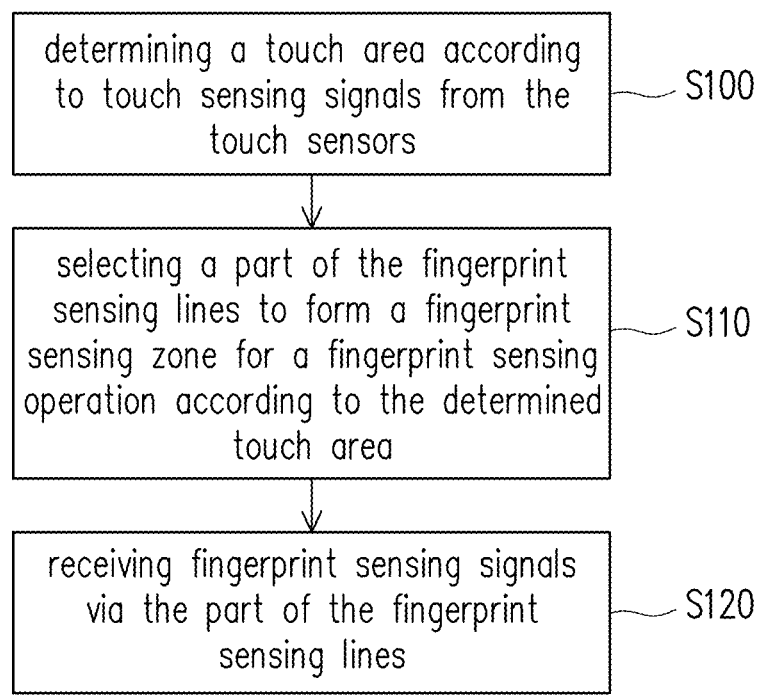
FIG. 8 illustrates steps in a method for sensing at least one fingerprint image according to an embodiment of the invention.

FIG. 8 is a flowchart illustrating steps in a method for sensing at least one fingerprint image according to an embodiment of the invention. Referring to FIG. 5 and FIG. 8, in the present embodiment, the method for sensing the at least one fingerprint image is at least adapted to the electronic device 200 depicted in FIG. 5, but the disclosure is not limited thereto. Taking the electronic device 200 for example, in step S100, the electronic circuit 110 determines a touch area TSA according to touch sensing signals S1 from the touch sensors 124. In step S110, the electronic circuit 110 selects a part of the fingerprint sensing lines FSL to form the fingerprint sensing zone 405 for the fingerprint sensing operation according to the determined touch area TSA. In step S120, the electronic circuit 110 receives fingerprint sensing signals S3 via the part of the fingerprint sensing lines FSL.

Figure 9:
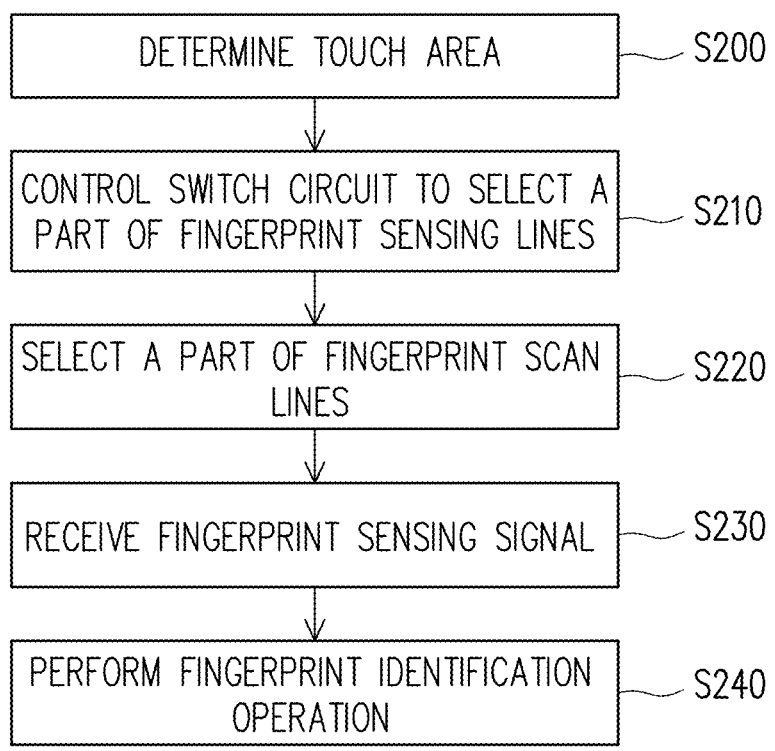
FIG. 9 is a flowchart illustrating steps in a method for fingerprint identification according to an embodiment of the invention.

FIG. 9 is a flowchart illustrating detail steps in a method for fingerprint identification according to an embodiment of the invention. Referring to FIG. 5 and FIG. 9, in the present embodiment, the method for fingerprint identification is at least adapted to the electronic device 200 depicted in FIG. 5, but the disclosure is not limited thereto. Taking the electronic device 200 for example, in step S200, the touch controller 141 preferably performs a touch sensing operation to determine the touch area TSA according to the touch sensing signal S1 from the touch sensors 124. As noted above, the touch area information preferably include coordinates for a detected object image, and/or merely information about particular sensors which is then mapped to coordinate information. In some embodiments the location of an object presented on or in proximity to a panel surface for identification may be determined through other means than that known or later developed in the art. In step S210, the digital circuit 161 controls the switch circuit 118 to preferably select a subset of the fingerprint sensing lines FSL for the fingerprint sensing operation. In step S220, the digital circuit 161 then preferably selects a subset of the fingerprint scan lines GSL for the fingerprint sensing operation, again according to the determined touch area TSA. In step S230, the digital circuit 161 then preferably receives the fingerprint sensing signal S3 via the part of the fingerprint sensing lines FSL. In step S240, the application processor 230 receives the entirety of the fingerprint image from the digital circuit 161 and performs the fingerprint identification operation based on well-known algorithms.

Methods for identifying and comparing fingerprint images after they are captured by the structures and operations of the present invention are well-known in the art and on that basis are not described herein. It will be further understood by skilled artisans that the selection process for the sizing, shaping and controlling of the sensed zones and scanning sequence of objects such as fingerprints may be driven in part by the algorithmic intelligence of fingerprint identification operations.

Figure 10A:
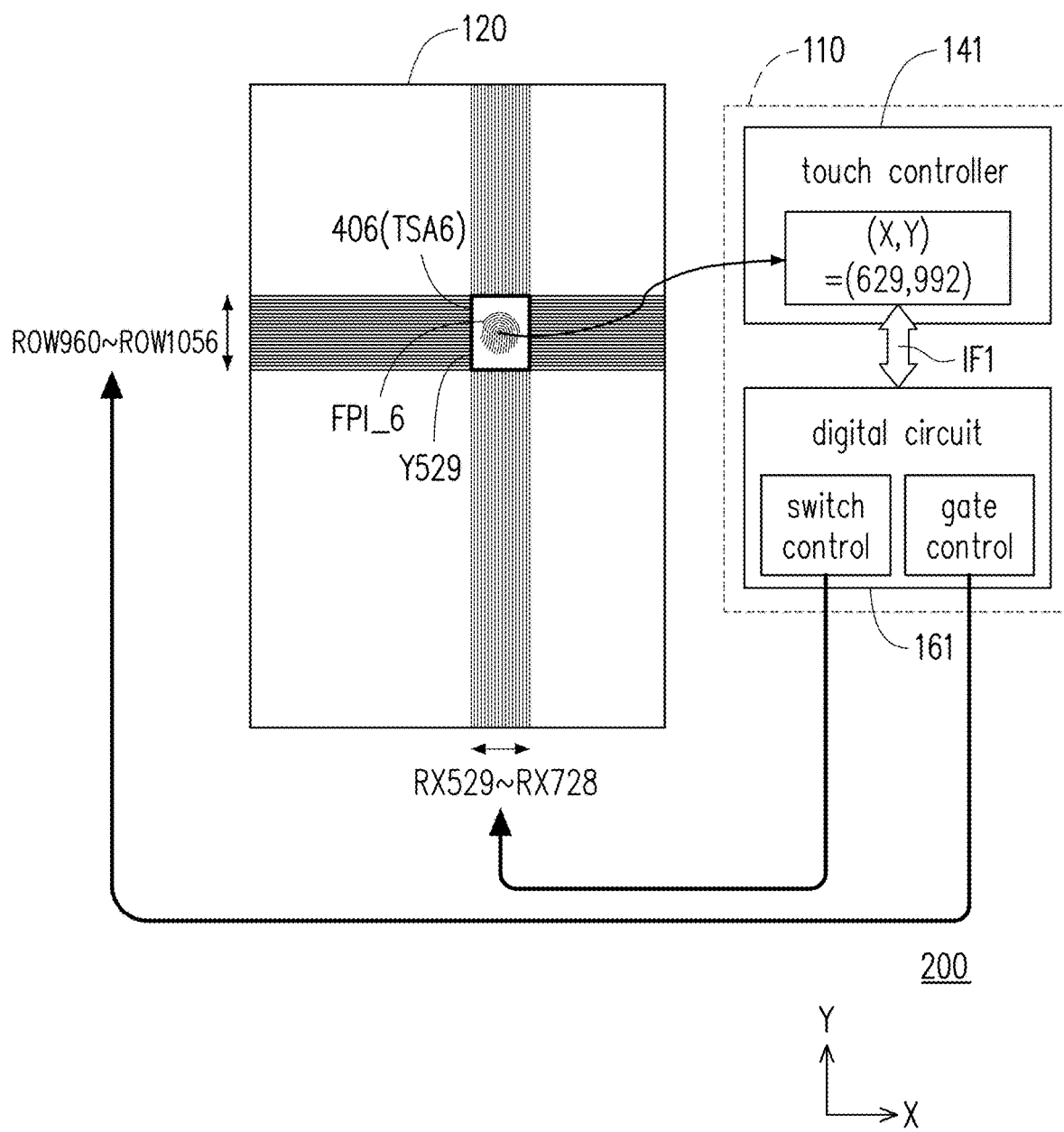
FIG. 10A and FIG. 10B are schematic diagrams illustrating aspects of the structures affected by a method for selecting the fingerprint sensing lines and the fingerprint scan lines according to an embodiment of the invention.
Figure 10B:
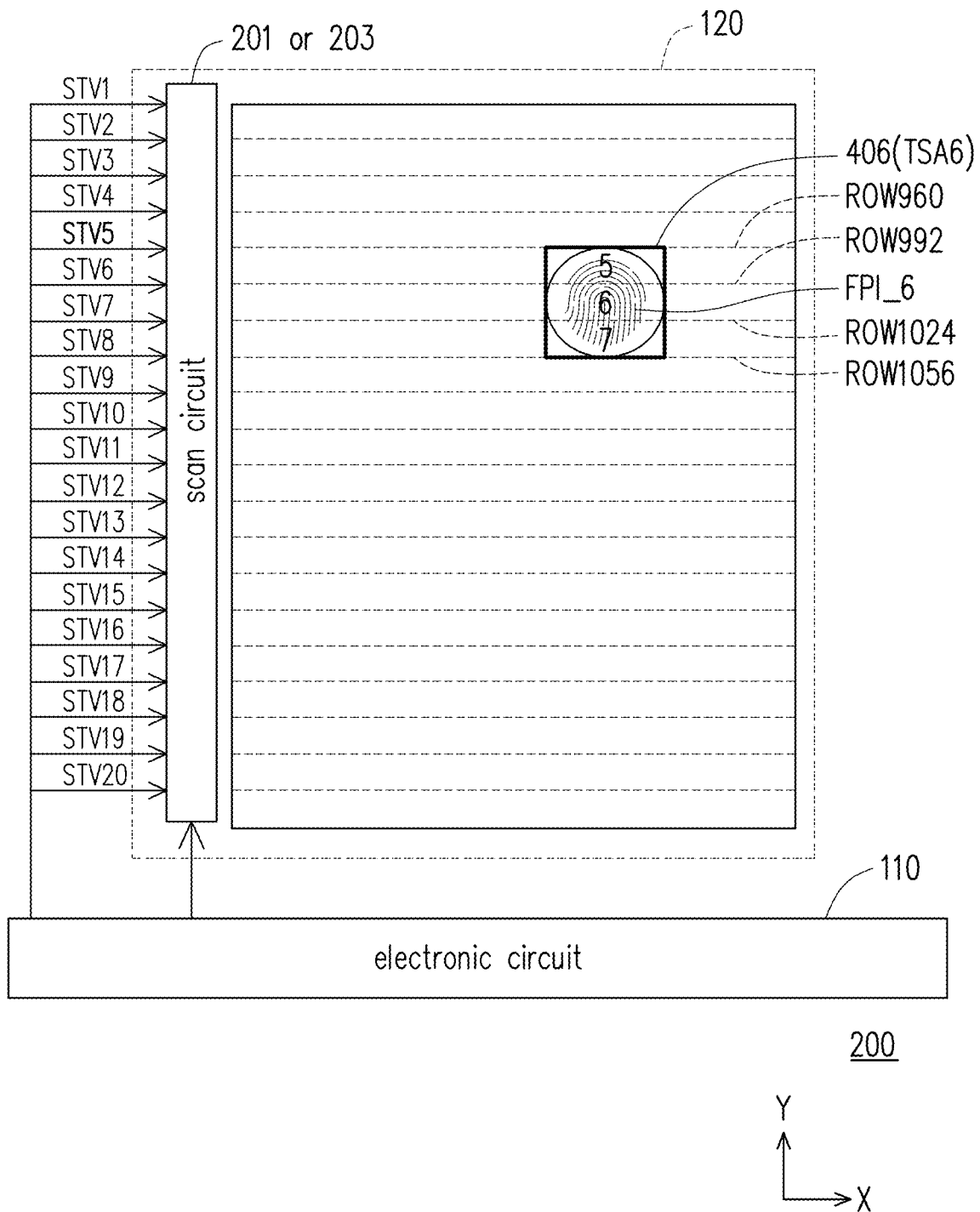

FIG. 10A and FIG. 10B are schematic diagrams illustrating aspects of the structures affected by a method for selecting the fingerprint sensing lines and the fingerprint scan lines according to an embodiment of the invention. Referring to FIG. 10A and FIG. 10B, the converter circuit 163 may be designed as noted earlier to have 200 fingerprint sensing channels, when a number of the fingerprint sensing lines FSL is 1000. The number of the fingerprint sensing lines FSL and the number of the fingerprint sensing channels are merely exemplary and it is expected to vary from device to device, and thus the invention is not limited in this fashion.

In the example shown, the touch controller 141 determines the location coordinates (X, Y) of the touch area TSA6 as (629, 992) and informs the digital circuit 161 of such information. The digital circuit 161 then selects the fingerprint sensing lines RX529 to RX728 as the subset for sensing a fingerprint image FPI_6 via the switch circuit 118 according to the X-axis coordinate information of the touch area TSA6; as noted earlier, the fingerprint sensing lines RX529 and RX728 are selected to constitute the boundaries or edges of the fingerprint sensing zone 406.

As also noted above, fixed fingerprint sensing zones of the display panel 120 are preferably not determined or associated with the fingerprint sensing lines in advance. Therefore, the fingerprint sensing lines are flexibly selected to form the fingerprint sensing zone 406 (the variable sized object imaging zone) having a range determined by the touch area TSA6. The digital circuit 161 selects and drives the fingerprint scan lines ROW960 to ROW1056 according to the Y-axis coordinate information of the touch area TSA6. The fingerprint sensing signals (a predetermined number of the object image sensing signals) carried on each of the fingerprint sensing lines RX529 to RX728 are read out at the same time.

In other words, the third circuit 130 is adapted to scan an entirety of the object image FPI_6 in the variable sized object imaging zone 406. No zone-crossing scanning is required. The third circuit 130 controls scanning of the variable subset of the imaging sensors extending from a boundary Y529 associated with the variable sized object imaging zone 406.

In FIG. 10B, the process for selecting an exemplary set of fingerprint scan lines ROW960 to ROW1056 for a fingerprint sensing operation is described in detail. In the present embodiment, the display panel 120 preferably includes a plurality of scan zones in the Y-axis direction. The determined touch area TSA6 in this instance extends or covers over three scan zones which are located between the fingerprint scan lines ROW960 to ROW1056. The digital circuit 161 drives the gate drivers 165_1 and/or 165_2 as illustrated in FIG. 5 to output scan signals STV5 through STV7 to the scan circuits 201 and/or 203 according to the Y-axis coordinate information of the touch area TSA6. The scan signals STV5 to STV7 respectively correspond to the three scan zones covered by the touch area TSA6 for the scan circuits 201 and/or 203 to initiate scanning of the fingerprint scan lines ROW960 to ROW1056. The number of the scan signals shown is by way of example, and as understood by skilled artisans will vary in accordance with panel touch sensor sizes, a detected fingerprint size, and system requirements, and therefore the invention is not limited in this respect. In response to the scan signals STV5 to STV7, the scan circuits 201 and/or 203 scan the fingerprint sensing zone 406 in a range extending from the fingerprint scan lines ROW960 to ROW1056. The scan circuits 201 and/or 203 thus can complete the scan operation based on the scan signals STV5 and STV7.

In other words, the switch circuit 118 of FIG. 6 or FIG. 5 is adapted to switch the variable subset of the imaging sensors and transmit the object image sensing signals S3 to the converter circuit 163 under control of the third circuit 130.

Referring again to FIG. 10B, it should be apparent that each object/fingerprint may cover one or more zones in the Y-axis direction. The labels STV1 to STV20 in the figure indicate enabling signals for each of the respective zone. Each zone includes multiple GSLs, again, which can be varied in number according to system requirements. As shown in FIG. 10B, the fingerprint sensing zone 406 formed according to TSA6 covers three predefined zones 5, 6, and 7 such that the set of GSLs for all three zones are selected. In operation, the selected GSLs preferably scan downwards, with STV5 asserted to enable scanning of GSLs of the 5th zone first, then STV6 is enabled for scanning the 6th zone's GSLs, and STV7 follows for scanning the 7th zone's and so on. Scanning of GSLs in a predefined zone is thus preferably conducted by the scan circuit 201/203 as enabled by a corresponding STV signal. The scan circuit is disposed on the display panel 120 and adapted such that only few STV signals—instead of hundreds of GSL signals—are required to be output from the electronic circuit 110 for controlling the scanning of GSLs.

Figure 11:
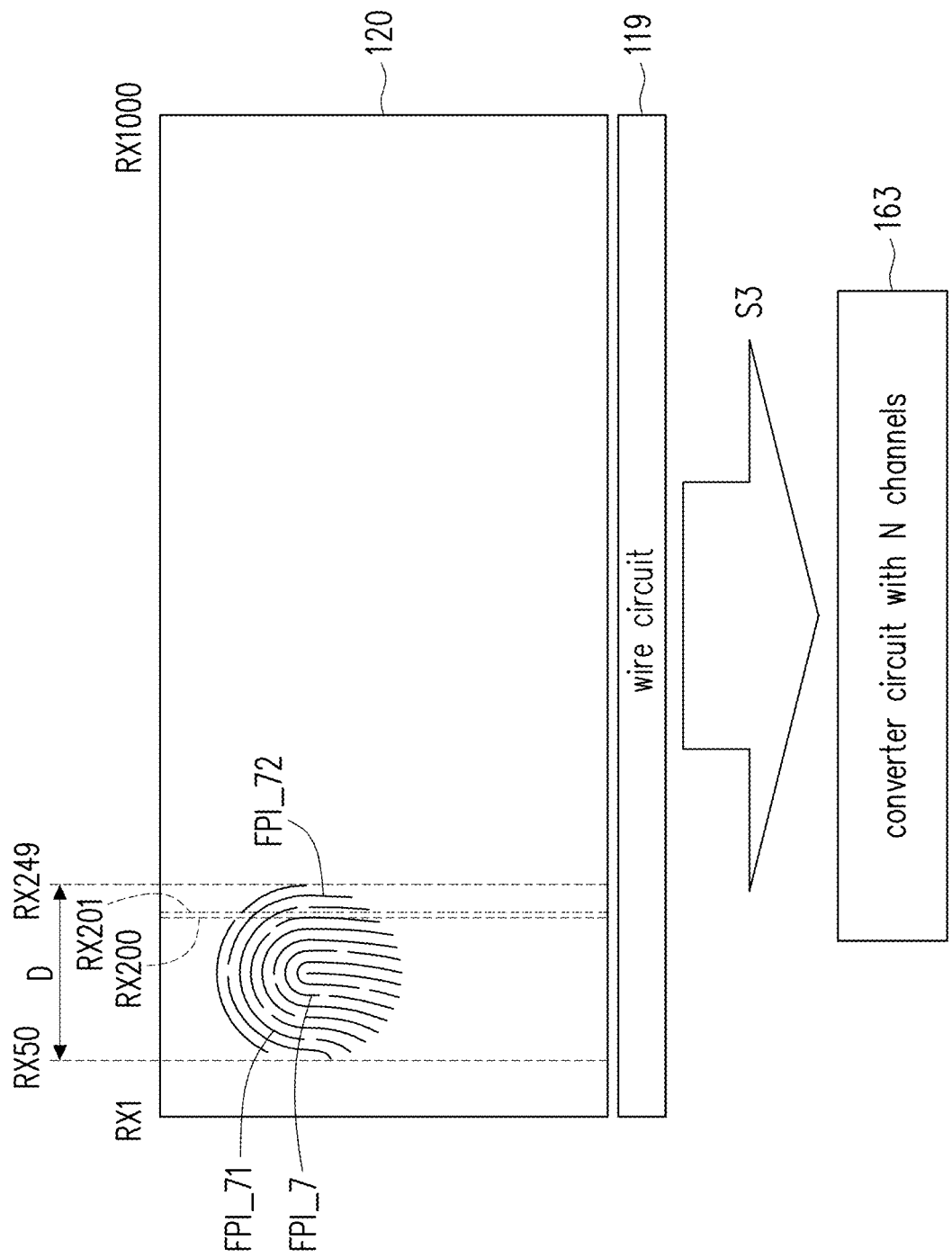
FIG. 11, FIG. 12 and FIG. 13 are schematic diagrams illustrating a remapping operation according to an embodiment of the invention.
Figure 13:
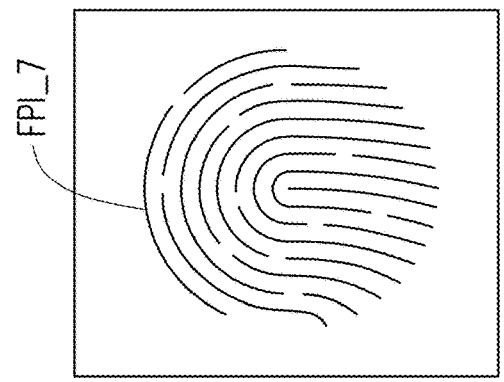
Figure 12:
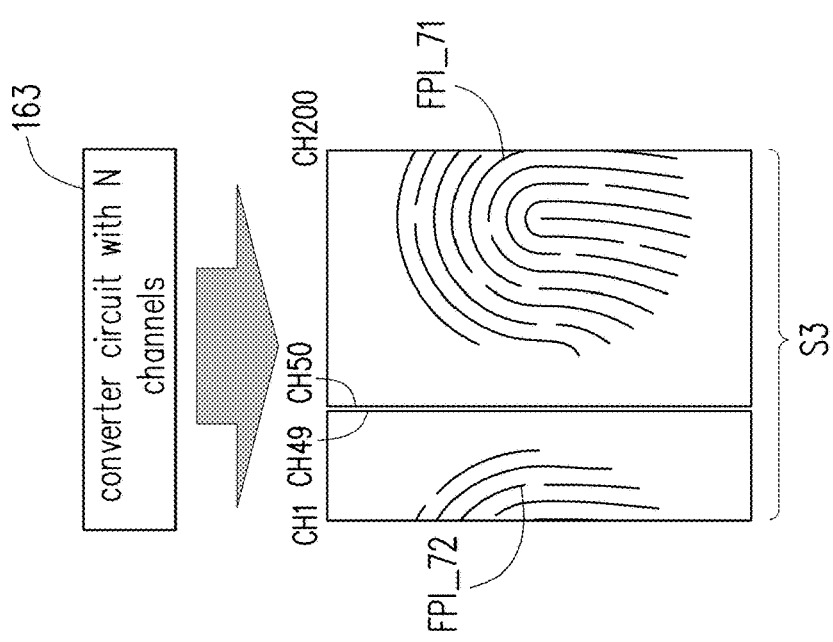

FIG. 11, FIG. 12 and FIG. 13 are schematic diagrams illustrating a remapping operation according to an embodiment of the invention, which may be necessary in some operational use cases. Referring to FIG. 11 to FIG. 13, because the detected fingerprint overlaps two different logical groups (each having a channel size of 200 fingerprint sensing channels as noted earlier), the fingerprint sensing circuit 116 generates the fingerprint image FPI_7 according to the fingerprint sensing signal S3 by use of a remapping operation.

As noted above, the converter circuit 163 preferably has 200 fingerprint sensing channels when a number of fingerprint sensing lines is 1000. Similar to the description earlier, digital circuit 161 selects the fingerprint sensing lines RX50 to RX249 for fingerprint sensing, and the fingerprint sensing lines RX50 and RX249 are thus selected and identified to be boundaries of the fingerprint sensing zone. As further alluded to earlier, the fingerprint sensing zones for display panel 120 are not determined for each of the fingerprint sensing lines RX1 to RX1000 in advance. The fingerprint sensing signal S3 carried on fingerprint sensing lines RX50 to RX249 are read out by the converter circuit 163 at the same time. The converter circuit 163 receives the fingerprint sensing signal S3 from the fingerprint sensing lines RX50 to RX249 in a single-turn receiving manner, i.e., one row or scan line at a time. That is to say, the converter circuit 163 receives the fingerprint sensing signal S3 from all of the selected fingerprint sensing lines RX50 to RX249 at once during a single fingerprint sensing phase. After signal conversion operation, the converter circuit 163 transmits the fingerprint sensing signal S3 as depicted in FIG. 12 in the form of data from the fingerprint sensing channels CH1 to CH200 to the digital circuit 161.

In the present embodiment, the first portion FPI_71 (right hand side) of the fingerprint image FPI_7 is preferably sensed via the fingerprint sensors connected to the fingerprint sensing lines RX50 to RX200 (from a first group of sensing lines) and is transmitted to the fingerprint sensing channels CH50 to CH200. The second portion FPI_72 (left hand side) of the fingerprint image FPI_7 is sensed via the fingerprint sensors connected to a different set of fingerprint sensing lines RX201 to RX249 (from a second group of sensing lines) and transmitted to the fingerprint sensing channels CH1 to CH49. The fingerprint sensing circuit 116 preferably generates the final composite fingerprint image FPI_7 according to the fingerprint sensing signal S3 by the remapping operation as depicted in FIG. 13. As seen in the figures, the second part FPI_72 is moved from the left side of the first part FPI_71 to the right side, such that the final remapped fingerprint image FPI_7 is generated in suitable form for later identification operations.

In other words, as illustrated in FIG. 12 and FIG. 13, the third circuit 130 of FIG. 3 is adapted to perform a remapping operation when the object spans adjacent logical image sensing channels CH1 to CH200.

Figure 14:
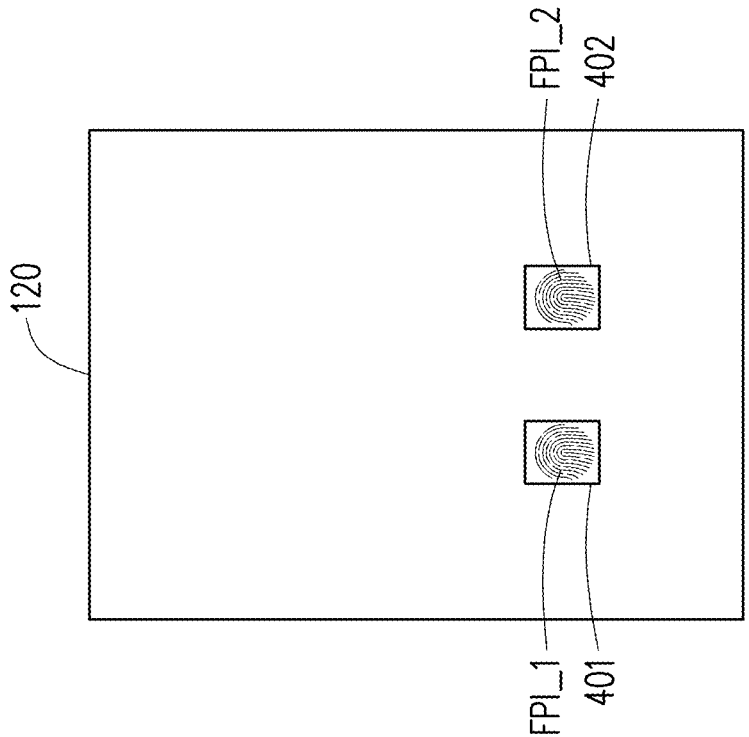
FIG. 14 and FIG. 15 are schematic diagrams illustrating display panels operating for sensing multiple fingerprint images according to different embodiments of the invention.
Figure 15:
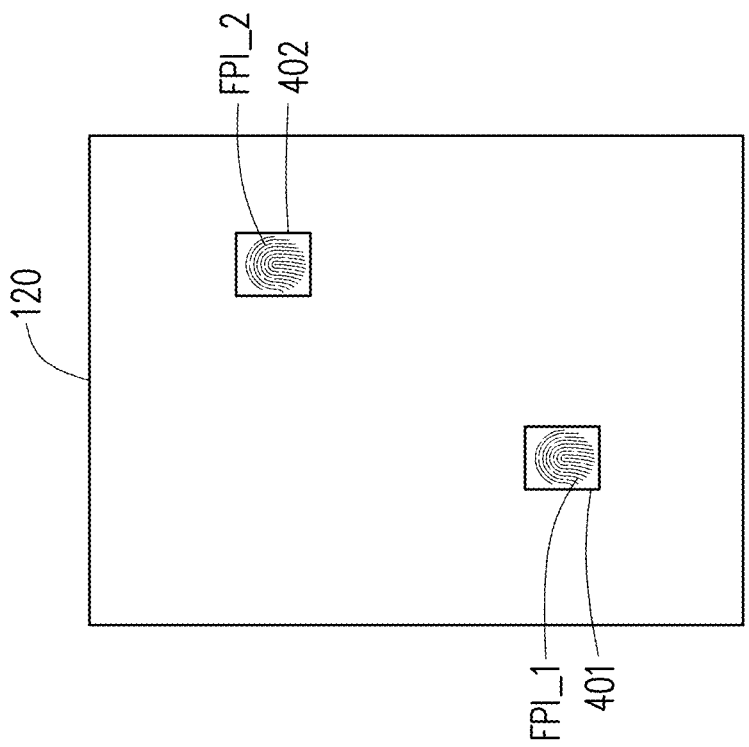

FIG. 14 and FIG. 15 are schematic diagrams illustrating display panels operating for sensing multiple fingerprint images according to different embodiments of the invention. This capability is useful when a device is adapted with an authentication program that requires multiple object (fingerprint) identifications simultaneously, from one or more users. Referring to FIG. 14 and FIG. 15, the electronic circuit 110 may drive and control the display panel 120 to sense multiple fingerprint images FPI_1 and FPI_2 on the display panel 120 at the same time. The fingerprint images FPI_1 and FPI_2 may be located in different rows as shown in FIG. 14, and/or in the same rows as shown in FIG. 15.

In FIG. 14, when the detected touches are in different scan zones or rows, the touch controller 141 informs the fingerprint sensing circuit 116 to sense the fingerprint images FPI_1 and FPI_2 via different subsets of the fingerprint scan lines GSL. The fingerprint sensing circuit 116 preferably receives the fingerprint sensing signal from all of the selected fingerprint sensing lines corresponding to the fingerprint images FPI_1 and FPI_2 at once during a single fingerprint sensing phase.

In FIG. 15, because of their detected touch location in the same row in the Y-axis direction the touch controller 141 informs the fingerprint sensing circuit 116 to sense the fingerprint images FPI_1 and FPI_2 via the same subset of fingerprint scan lines GSL. The fingerprint sensing circuit 116 receives the fingerprint sensing signal from all of the selected fingerprint sensing lines corresponding to the fingerprint images FPI_1 and FPI_2 at once during the same fingerprint sensing phase.

That is to say, the third circuit 130 of FIG. 3 generates the variable sized object imaging zone 401 based on a location and a size of the object image FPI_1, and generates another variable sized object imaging zone 402 based on a location and a size of another object image FPI_2 presented within the display panel 120 at the same time as the object image FPI_1.

Figure 16:
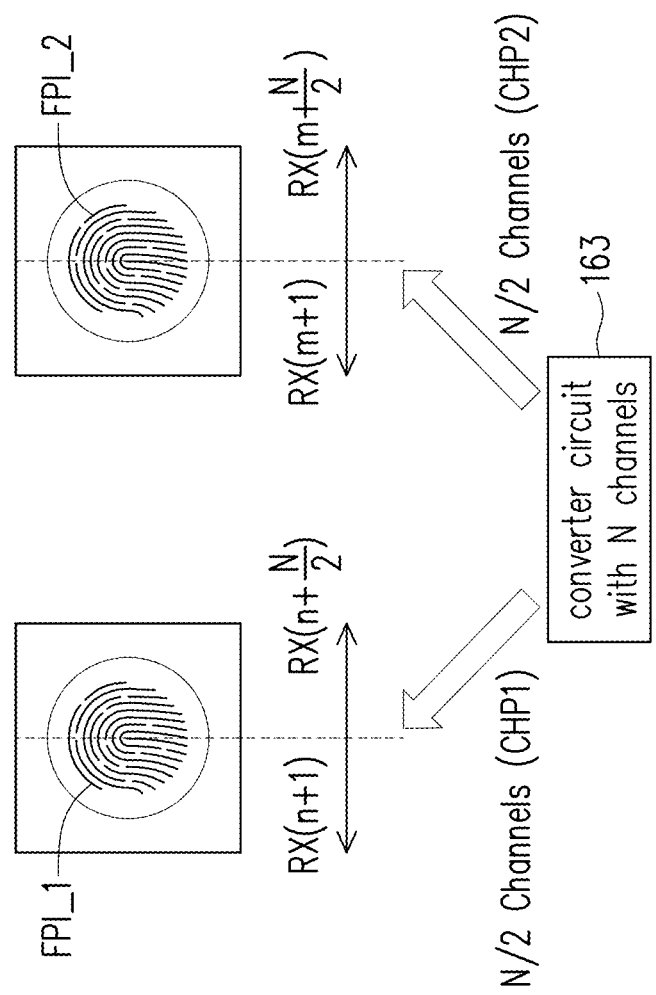
FIG. 16 is a schematic diagram illustrating a converter circuit of the fingerprint sensing circuit configured to sense multiple fingerprint images according to another embodiment of the invention.

FIG. 16 is a schematic diagram illustrating a converter circuit of the fingerprint sensing circuit configured to sense multiple fingerprint images according to another embodiment of the invention. For sensing multiple fingerprint images FPI_1 and FPI_2, the converter circuit 163 is preferably configured to have a total of N fingerprint sensing channels to receive and process a pair of corresponding fingerprint sensing signals.

In FIG. 16, the N fingerprint sensing channels are grouped into two subsets CHP1 and CHP2. Each subset includes a portion of the entire set of fingerprint sensing channels to receive and process a corresponding fingerprint sensing signal. For example, if N is an even number, the fingerprint sensing circuit 116 may select the fingerprint sensing lines RX(n+1) to RX(n+N/2) to sense a first fingerprint image FPI_1, and the first set of fingerprint sensing lines RX(n+1) and RX(n+N/2) are selected to be the range and boundaries of a first fingerprint sensing zone. The fingerprint sensing signal corresponding to the fingerprint image FPI_1 is then captured and transmitted to the first part CHP1 with N/2 fingerprint sensing channels. For the second fingerprint detected, fingerprint sensing circuit 116 selects the fingerprint sensing lines RX(m+1) to RX(m+N/2) to sense the second fingerprint image FPI_2, and the second set of fingerprint sensing lines RX(m+1) and RX(m+N/2) are selected to be corresponding boundaries of the second fingerprint sensing zone. The second fingerprint sensing signal corresponding to the second fingerprint image FPI_2 is transmitted to the second part CHP2 with N/2 fingerprint sensing channels. The fingerprint sensing signals carried on the selected part of fingerprint sensing lines RX(n+1) to RX(n+N/2) and RX(m+1) to RX(m+N/2) are preferably read out by the converter circuit 163 at the same time. In another embodiment, the numbers of the fingerprint sensing channels of the two parts CHP1 and CHP2 are not necessarily equal. It will be apparent from the present disclosure that the total number of the fingerprint sensing channels of CHP1 and CHP2 can be configured as required to be smaller than or equal to N.

Figure 17:
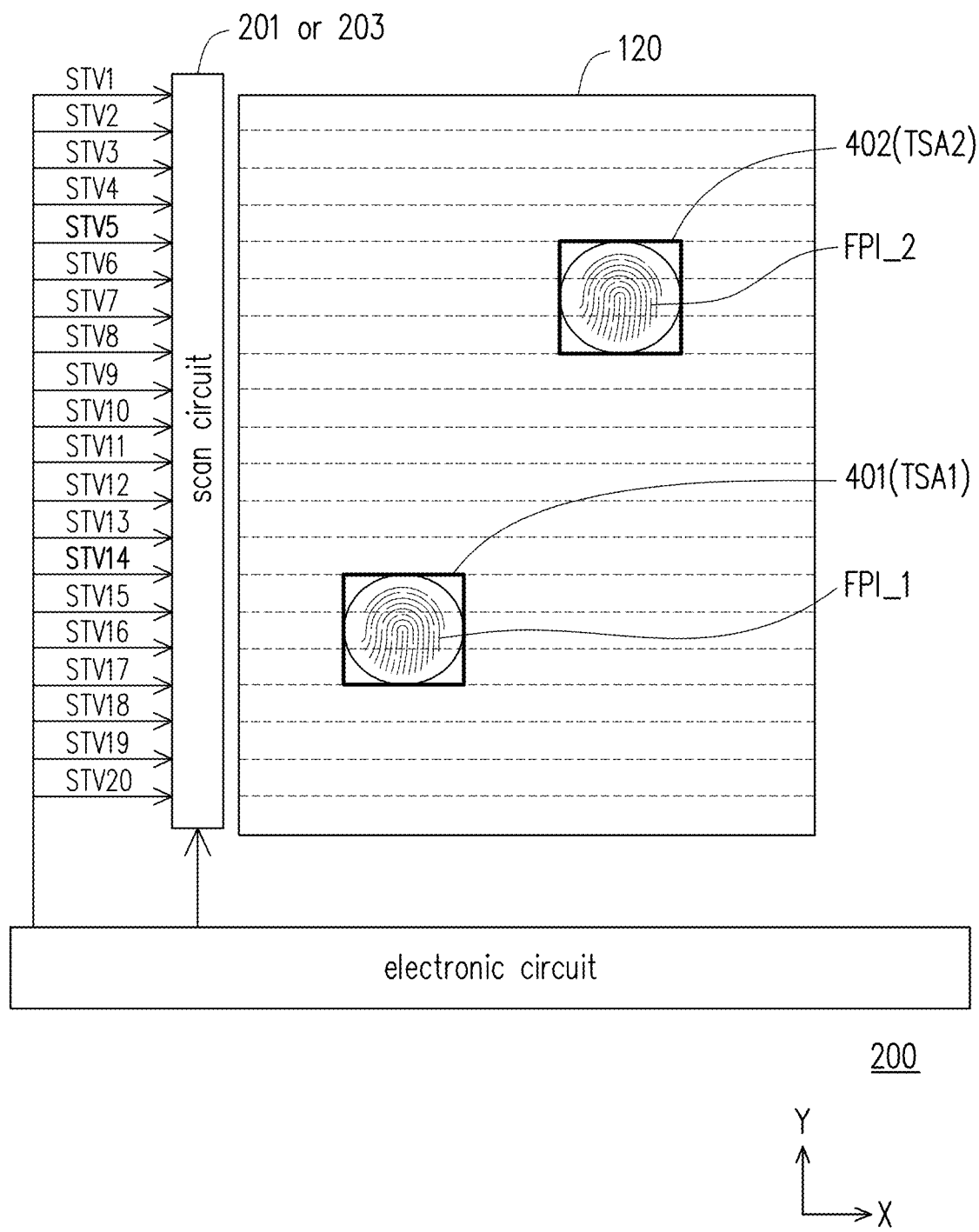
FIG. 17 is a schematic diagram illustrating a preferred method for controlling the scan circuit configured to sense multiple fingerprint images according to an embodiment of the invention.

FIG. 17 is a schematic diagram illustrating a preferred method for controlling the scan circuit configured to sense multiple fingerprint images according to an embodiment of the invention. Referring to FIG. 17, the electronic circuit 110 controls the display panel 120 to sense multiple fingerprint images FPI_1 and FPI_2. As with the single object image detection, the electronic circuit 110 determines the coordinates of the touch areas TSA1 and TSA2 corresponding to the fingerprint images FPI_1 and FPI_2. The fingerprint sensing zones 401 and 402 are respectively defined by the touch areas TSA1 and TSA2. If the multiple fingerprint images FPI_1 and FPI_2 do not overlap in the X-axis direction, the electronic circuit 110 can control the scan circuits 201 and/or 203 to scan the fingerprint sensing zones 401 and 402 during a single fingerprint sensing phase in the Y-axis direction. In this manner, the fingerprint sensing zones 401 and 402 may be simultaneously scanned to reduce sensing time.

Figure 18:
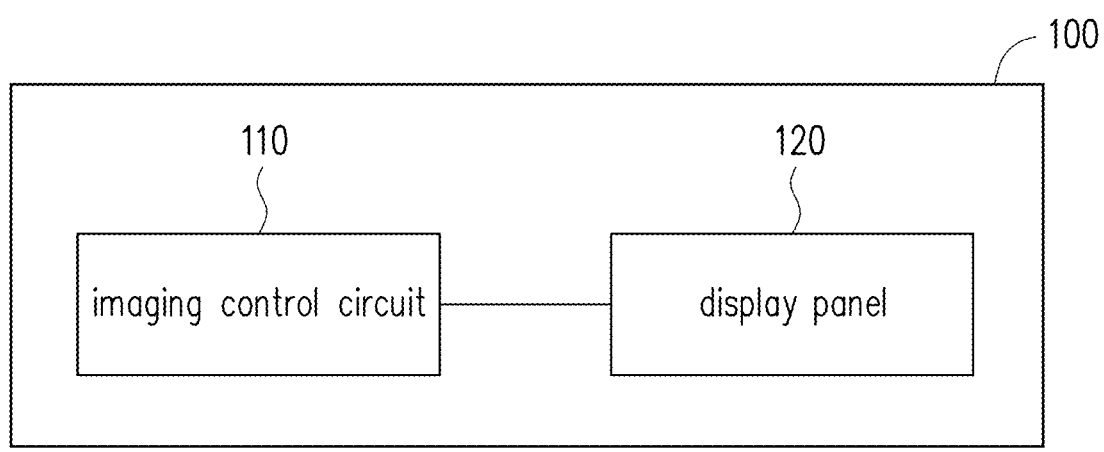
FIG. 18 is a schematic block diagram illustrating a portable electronic device according to an embodiment of the invention.
Figure 19:
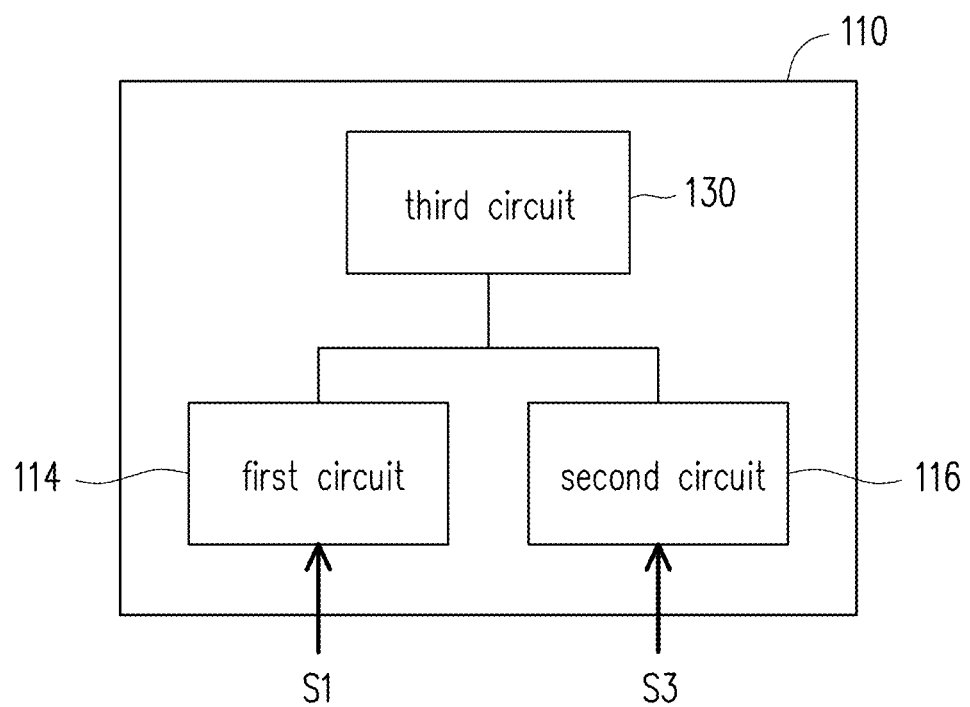
FIG. 19 is a schematic block diagram illustrating key components of an imaging control circuit depicted in FIG. 18.

FIG. 18 is a schematic block diagram illustrating a portable electronic device according to an embodiment of the invention. FIG. 19 is a schematic block diagram illustrating key components of an imaging control circuit depicted in FIG. 18. Referring to FIG. 2, FIG. 5, FIG. 18 and FIG. 19, the imaging control circuit 110 and the display panel 120 are integrated within the portable electronic device 100 adapted to identify human fingerprints. The imaging control circuit 110 is for collecting object image data for an object presented on a portion of a surface of the display panel 120. The object may be a human appendage, e.g. a user's finger. The object is detected based on optical and/or acoustic detectable features of the object.

To be specific, the imaging control circuit 110 includes a first circuit 114, a second circuit 116, and a third circuit 130. The third circuit 130 may include the touch controller 141 and the digital circuit 161. The first circuit 114, e.g. the converter circuit 143, is adapted to receive touch sensing signals S1 from a set of touch sensors 124 located in the display panel 120. The second circuit 116, e.g. the converter circuit 163, is adapted to receive object image sensing signals S3 from a set of imaging sensors 126. The object image sensing signals S3 are associated with the object detected on the surface of the display panel 120. The third circuit 130 is adapted to determine a location of the object from the touch sensing signals S1, and generate a variable sized object imaging zone 405 of FIG. 5 based on a location and a size of an object image FPI_5. The variable sized object imaging zone 405 includes a variable subset of the imaging sensors 126.

Figure 20:
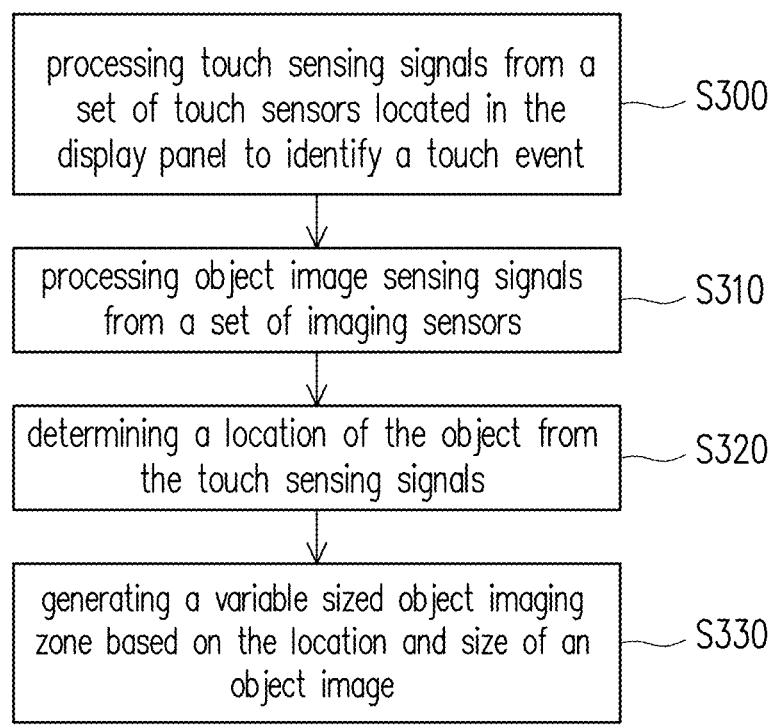
FIG. 20 is a flowchart illustrating steps in a method of capturing object image data for an object presented on a portion of a surface of a display panel according to an embodiment of the invention.

FIG. 20 is a flowchart illustrating steps in a method of capturing object image data for an object presented on a portion of a surface of a display panel according to an embodiment of the invention. Referring to FIG. 2, FIG. 5, FIG. 18 to FIG. 20, in the present embodiment, the method of capturing the object image data for the object is at least adapted to the portable electronic device 100 depicted in FIG. 18 and FIG. 19, but the disclosure is not limited thereto.

Taking the portable electronic device 100 for example, in step S300, the imaging control circuit 110 processes touch sensing signals S1 from a set of touch sensors 124 located in the display panel 120 to identify a touch event. In step S310, the imaging control circuit 110 processes object image sensing signals S3 from a set of imaging sensors 126, which the object image sensing signals S3 are associated with the object detected on the surface of the display panel 120. In step S320, the imaging control circuit 110 determines a location of the object from the touch sensing signals S1. In step S330, the imaging control circuit 110 generates a variable sized object imaging zone 405 based on the location and size of the object image FPI_5. The variable sized object imaging zone 405 includes a variable subset of the imaging sensors 126.

FIG. 21 is a schematic block diagram illustrating key components of an imaging control circuit depicted in FIG. 18 according to another embodiment of the invention. Referring to FIG. 2, FIG. 5, FIG. 18 and FIG. 21, the imaging control circuit 110 is for controlling image scanning of a human appendage presented on a portion of a surface of the display panel 120. The display panel 120 includes both input and output capability, e.g. an image sensing function and an image display function.

To be specific, the imaging control circuit 110 includes a touch circuit 114, an imaging circuit 116, and a scanning control circuit 130. The touch circuit 114 is adapted to receive touch sensing signals S1 detected from the human appendage by a set of touch sensors 124 located in the display panel 120. The imaging circuit 116 is adapted to receive appendage image sensing signals S3 associated with an appendage image FPI_5 by a set of image sensors 126 also located in the display panel 120. In an embodiment, the human appendage is a human finger, and the image sensing signals S3 are related to epidermal ridges. In an embodiment, the appendage image FPI_5 is an optical image and/or an acoustic image.

The scanning control circuit 130 is coupled to the touch circuit 114 and the imaging circuit 116. The scanning control circuit 130 is adapted to determine a location and at least one boundary B1 of the appendage image FPI_5 from one or more of the set of touch sensors 124. The scanning control circuit 130 is adapted to generate an appendage imaging zone 405 based on the determined location of the appendage image FPI_5. The appendage imaging zone 405 includes a variable number of appendage image sensing signals S3. The variable number of appendage image sensing signals S3 extends from the at least one boundary B1 and spans a width D1 of the appendage image FPI_5. The scanning control circuit 130 is adapted to collect appendage image data from the appendage imaging zone 405.

The scanning control circuit 130 reduces capture time for the appendage image FPI_5 by sensing only the variable number of the appendage image sensing signals S3 selected for the appendage imaging zone 405.

Figure 22:
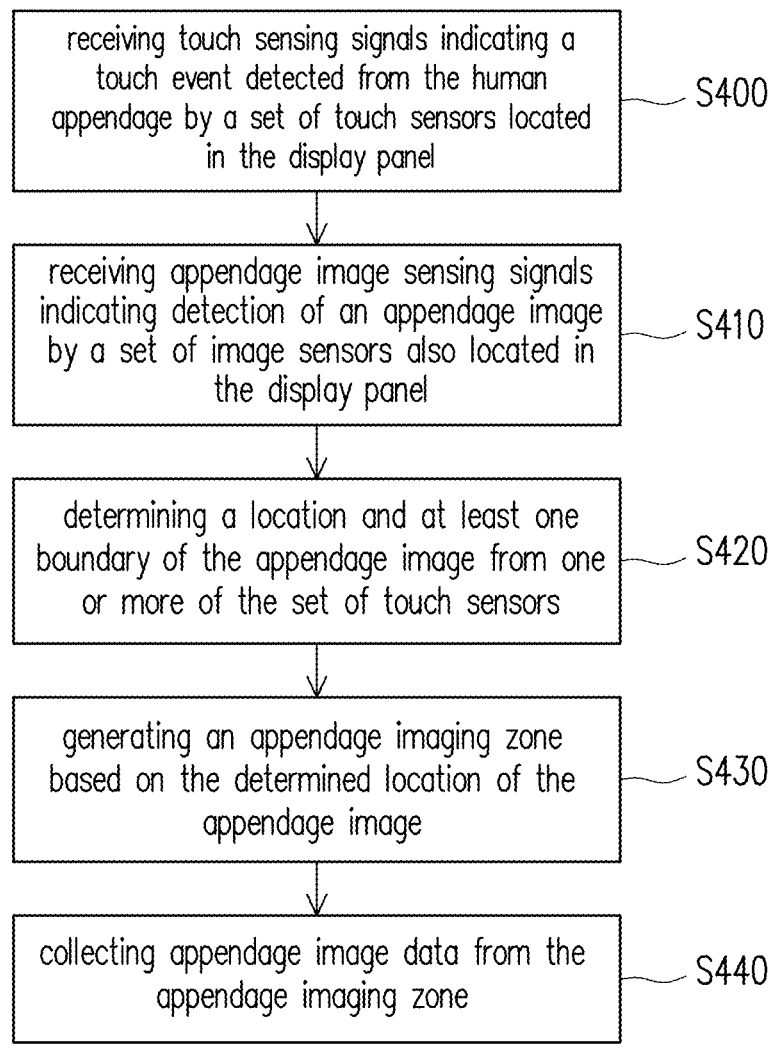
FIG. 22 is a flowchart illustrating steps in a method of controlling image scanning of a human appendage presented on a portion of a surface of a display panel according to an embodiment of the invention.

FIG. 22 is a flowchart illustrating steps in a method of controlling image scanning of a human appendage presented on a portion of a surface of a display panel according to an embodiment of the invention. Referring to FIG. 2, FIG. 5, FIG. 18 and FIG. 21 to FIG. 22, in the present embodiment, the method of controlling the image scanning of the human appendage is at least adapted to the portable electronic device 100 depicted in FIG. 18 and FIG. 21, but the disclosure is not limited thereto.

Taking the portable electronic device 100 for example, in step S400, the imaging control circuit 110 receives touch sensing signals S1 indicating a touch event detected from the human appendage by a set of touch sensors 124 located in the display panel 120. In step S410, the imaging control circuit 110 receives appendage image sensing signals S3 indicating detection of an appendage image FPI_5 by a set of image sensors 126 also located in the display panel 120. In step S420, the imaging control circuit 110 determines a location and at least one boundary B1 of the appendage image FPI_5 from one or more of the set of touch sensors 124.

In step S430, the imaging control circuit 110 generates an appendage imaging zone 405 based on the determined location of the appendage image FPI_5. The appendage imaging zone 405 includes a variable number of the appendage image sensing signals S3 extending from the at least one boundary B1 and spans a width D1 of the appendage image FPI_5. In step S440, the imaging control circuit 110 collects appendage image data from the appendage imaging zone 405.

Figure 23:
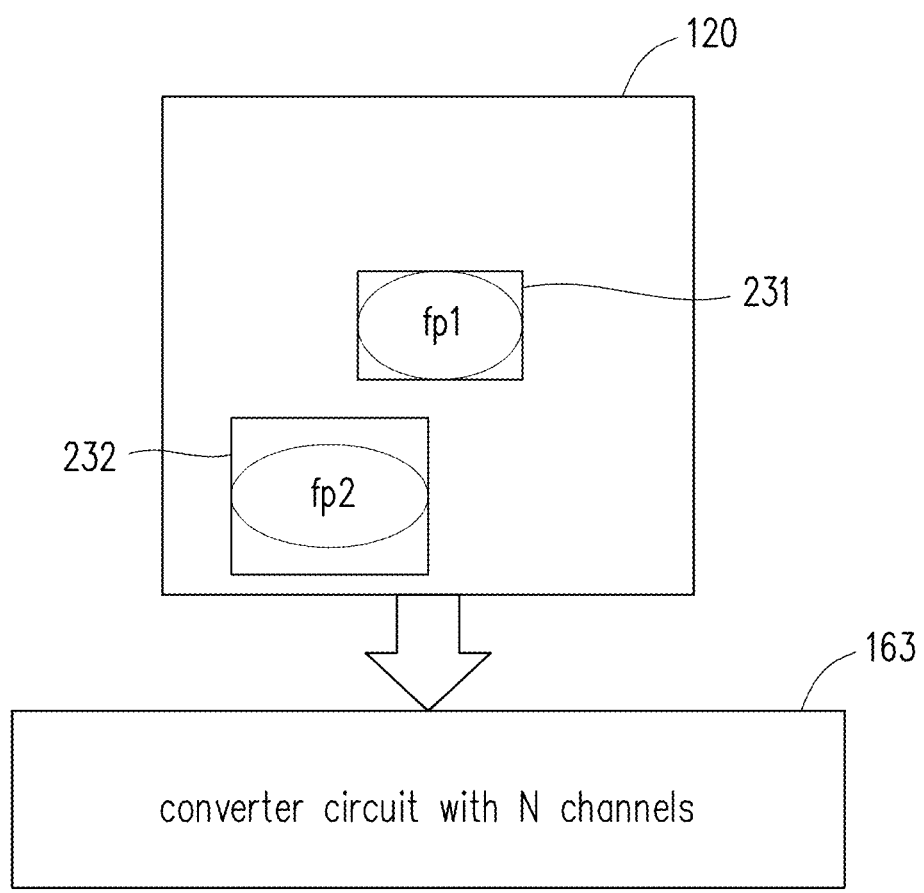
FIG. 23 illustrates variable sized sensing zones determined according to different sized fingerprint according to an embodiment of the invention.

FIG. 23 illustrates variable sized sensing zones determined according to different sized fingerprint according to an embodiment of the invention. Referring to FIG. 23, a sensing zone 231 is determined according to the size of the fingerprint image fp1, and the sensing zone 231 includes m1 sensing lines, where m1<N, and N is the total number of the sensing lines of the display panel 120. A sensing zone 232 is determined according to the size of the fingerprint image fp2, and the sensing zone 232 includes m2 sensing lines, where m2<N, and m2>m1. The summation of m1+m2 is smaller than or equal to N.

When the sensing zone 231 is determined, m1 channels of the converting circuit 163 that has totally N channels are used to sense the fingerprint image fp1. When the sensing zone 232 is determined, m2 channels of the converting circuit 163 are used to sense the fingerprint image fp2. That is to say, in the present embodiment, the variable sized sensing zones 231 and 232 are determined according to different sized fingerprints fp1 and fp2.

Figure 24:
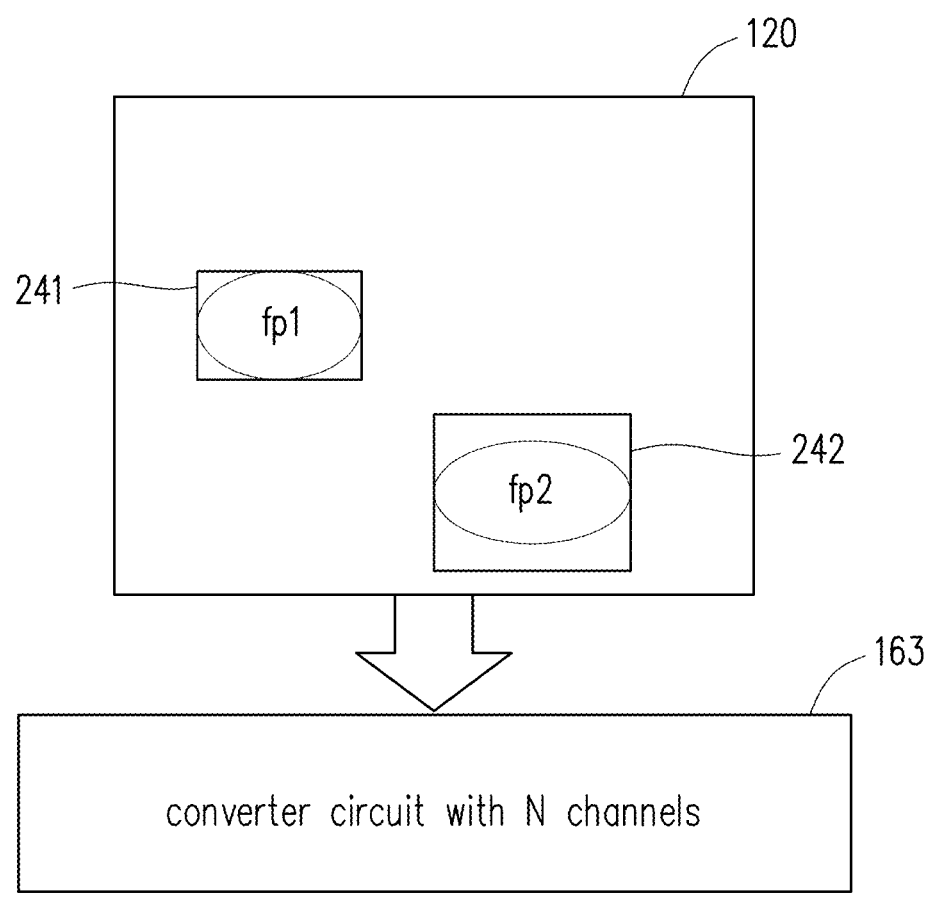
FIG. 24 illustrates multiple fingerprints of different sizes are sensed in an N channel converting circuit simultaneously according to an embodiment of the invention.

FIG. 24 illustrates multiple fingerprints of different sizes are sensed in an N channel converting circuit simultaneously according to an embodiment of the invention. Referring to FIG. 24, for an application of multiple fingerprint authentication, the fingerprints fp1 and fp2 may be from different users, or may be from different fingers (may have different size) of one user. In the present embodiment, multiple fingerprints fp1 and fp2 of different sizes are sensed by the converting circuit 163 simultaneously.

In summary, in the embodiments of the invention, fingerprint sensing zones of the display panel are preferably not determined for each of the fingerprint sensing lines in advance, and a touch area defines a variable sized/shaped fingerprint sensing zone for covering and capturing data for a fingerprint image. A subset of the fingerprint sensing lines and a subset of the fingerprint scan lines are selected for fingerprint sensing operation according to the identified touch area. A set of switches corresponding to the set of fingerprint sensing lines is turned on to couple the part of fingerprint sensing lines to corresponding fingerprint sensing channels. A set of the fingerprint sensing lines collocated with the touch area on the display panel is selected from a larger set of fingerprint sensing lines arranged over the entire display panel. The selected fingerprint sensing lines may flexibly form a single fingerprint sensing zone having a range determined by the touch area, and fingerprint sensing signals carried on the selected fingerprint sensing lines may be read out at the same time, such that only a single-turn receiving of fingerprint sensing signals in fingerprint sensing channels is required for sensing one horizontal line of the fingerprint image. Compared to the prior art, a number of operations and thus overall time for fingerprint sensing is reduced. Therefore, the process for fingerprint sensing and identification is more efficient, improving user experience.

It will be apparent to those skilled in the art that various modifications and variations can be made to the disclosed embodiments without departing from the scope or spirit of the disclosure. Those skilled in the art will also appreciate that the panel device and accompanying circuits may include other components not shown herein, which components are not material to the teachings of the present disclosure. In view of the foregoing, it is intended that the disclosure covers modifications and variations provided that they fall within the scope of the following claims and their equivalents.

What is claimed is:

1. An imaging control circuit for collecting object image data for an object presented on a portion of a surface of a display panel, the imaging control circuit comprising:
   a first circuit, adapted to receive touch sensing signals from a set of touch sensors located in the display panel;
   a second circuit, adapted to receive object image sensing signals from a set of imaging sensors, wherein the object image sensing signals are associated with the object detected on the surface of the display panel; and
   a third circuit, adapted:
   to determine a location of the object from the touch sensing signals; and
   to generate a variable sized object imaging zone based on a location and a size of an object image, wherein the variable sized object imaging zone comprises a variable subset of the imaging sensors, wherein the third circuit is adapted to perform a remapping operation when object spans adjacent logical image sensing channels.

2. The imaging control circuit of claim 1, wherein the imaging control circuit and the display panel are integrated within a portable electronic device adapted to identify human fingerprints.

3. The imaging control circuit of claim 1, wherein only the variable subset of the imaging sensors is scanned to generate the object image having sufficient information for an object identification operation.

4. The imaging control circuit of claim 1, wherein the object is a human appendage.

5. The imaging control circuit of claim 1, wherein the object is detected based on optical and/or acoustic detectable features of the object.

6. The imaging control circuit of claim 1, wherein the third circuit is adapted to generate the object image from the object image sensing signals.

7. The imaging control circuit of claim 1, wherein the third circuit controls scanning of the variable subset of the imaging sensors extending from a boundary associated with the variable sized object imaging zone.

8. The imaging control circuit of claim 1, further comprising:
   a switch circuit, adapted to switch the variable subset of the imaging sensors and transmit the object image sensing signals to the second circuit under control of the third circuit.

9. The imaging control circuit of claim 1, wherein the third circuit is adapted to generate another variable sized object imaging zone based on a location and a size of another object image presented within the display panel at the same time as the object image.

10. An imaging control circuit for controlling image scanning of a human appendage presented on a portion of a surface of a display panel which comprises both input and output capability, the imaging control circuit comprising:
- a touch circuit adapted to receive touch sensing signals detected from the human appendage by a set of touch sensors located in the display panel;
- an imaging circuit adapted to receive appendage image sensing signals associated with an appendage image by a set of image sensors located in the display panel;
- a scanning control circuit coupled to the touch circuit and the imaging circuit and adapted:
  - to determine a location and at least one boundary of the appendage image from one or more of the set of touch sensors;
  - to generate an appendage imaging zone based on the determined location of the appendage image, wherein the appendage imaging zone comprises a variable number of appendage image sensing signals extending from the at least one boundary and spanning a width of the appendage image; and
  - to collect appendage image data from the appendage imaging zone, wherein the scanning control circuit is adapted to perform a remapping operation when object spans adjacent logical image sensing channels.

11. The imaging control circuit of claim 10, wherein the human appendage is a human finger, and the image sensing signals are related to epidermal ridges.

12. The imaging control circuit of claim 10, wherein the scanning control circuit reduces capture time for the appendage image by sensing only the variable number of the appendage image sensing signals selected for the appendage imaging zone.

13. The imaging control circuit of claim 10, wherein the appendage image is an optical image and/or an acoustic image.

14. A method of capturing object image data for an object presented on a portion of a surface of a display panel, the method comprising:
- processing touch sensing signals from a set of touch sensors located in the display panel to identify a touch event;
- processing object image sensing signals from a set of imaging sensors, which the object image sensing signals are associated with the object detected on the surface of the display panel;
- determining a location of the object from the touch sensing signals; and
- generating a variable sized object imaging zone based on the location and size of an object image, wherein the variable sized object imaging zone comprises a variable subset of the imaging sensors, wherein a remapping operation is performed when object spans adjacent logical image sensing channels.

15. A method for controlling image scanning of a human appendage presented on a portion of a surface of a display panel which includes both input and output capability, the method comprising:
- receiving touch sensing signals indicating a touch event detected from the human appendage by a set of touch sensors located in the display panel;
- receiving appendage image sensing signals indicating detection of an appendage image by a set of image sensors located in the display panel;
- determining a location and at least one boundary of the appendage image from one or more of the set of touch sensors;
- generating an appendage imaging zone based on the determined location of the appendage image, wherein the appendage imaging zone comprises a variable number of the appendage image sensing signals extending from the at least one boundary and spanning a width of the appendage image; and
- collecting appendage image data from the appendage imaging zone, wherein a remapping operation is performed when object spans adjacent logical image sensing channels.

* * * * *